United States Patent
Goto et al.

(10) Patent No.: US 12,129,568 B2
(45) Date of Patent: Oct. 29, 2024

(54) SURFACE-TREATED STEEL SHEET

(71) Applicant: NIPPON STEEL CORPORATION, Tokyo (JP)

(72) Inventors: Yasuto Goto, Tokyo (JP); Kosuke Kawamoto, Tokyo (JP); Yuta Dairokuno, Tokyo (JP); Yuji Kajii, Tokyo (JP); Koki Shimada, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/035,745

(22) PCT Filed: Nov. 29, 2021

(86) PCT No.: PCT/JP2021/043526
§ 371 (c)(1),
(2) Date: May 7, 2023

(87) PCT Pub. No.: WO2022/118768
PCT Pub. Date: Jun. 9, 2022

(65) Prior Publication Data
US 2023/0407510 A1    Dec. 21, 2023

(30) Foreign Application Priority Data
Dec. 3, 2020    (JP) .................................. 2020-200744

(51) Int. Cl.
*C25D 5/50* (2006.01)
*C21D 1/74* (2006.01)
(Continued)

(52) U.S. Cl.
CPC ............. *C25D 5/50* (2013.01); *C21D 1/74* (2013.01); *C21D 6/005* (2013.01); *C21D 6/008* (2013.01);
(Continued)

(58) Field of Classification Search
None
See application file for complete search history.

(56) References Cited

U.S. PATENT DOCUMENTS 11,713,513 B2 * 8/2023 Saito ........................ C22C 19/03
428/680
2014/0050971 A1    2/2014 Tomomori et al.
(Continued)

FOREIGN PATENT DOCUMENTS

WO    2012/147843 A1    11/2012
WO    2018/181950 A1    10/2018
(Continued)

*Primary Examiner* — Daniel J. Schleis
(74) *Attorney, Agent, or Firm* — Renner, Otto, Boisselle & Sklar, LLP

(57) ABSTRACT

A surface-treated steel sheet includes a steel sheet, and an Ni—Co—Fe alloy layer containing Ni, Co, and Fe on the steel sheet surface. In the thickness direction of the Ni—Co—Fe alloy layer, a Co concentration in the Ni—Co—Fe alloy layer is highest at a position which is on an outermost surface side of the Ni—Co—Fe alloy layer relative to a position where the Ni concentration is highest in the Ni—Co—Fe alloy layer, and which is between the outermost surface of the Ni—Co—Fe alloy layer and a depth of 100 nm from the outermost surface. In the Ni—Co—Fe alloy layer, an Ni-concentrated region in which the Ni concentration increases toward the outermost surface of the Ni—Co—Fe alloy layer is formed between the outermost surface of the Ni—Co—Fe alloy layer and the position where the Co concentration is highest.

6 Claims, 7 Drawing Sheets

(51) Int. Cl.
| | |
|---|---|
| *C21D 6/00* | (2006.01) |
| *C21D 8/02* | (2006.01) |
| *C21D 9/46* | (2006.01) |
| *C22C 38/00* | (2006.01) |
| *C22C 38/02* | (2006.01) |
| *C22C 38/04* | (2006.01) |
| *C22C 38/06* | (2006.01) |
| *C25D 3/12* | (2006.01) |
| *C25D 3/56* | (2006.01) |
| *C25D 5/12* | (2006.01) |

(52) U.S. Cl.
CPC ......... *C21D 8/0205* (2013.01); *C21D 8/0221* (2013.01); *C21D 8/0278* (2013.01); *C21D 9/46* (2013.01); *C22C 38/001* (2013.01); *C22C 38/002* (2013.01); *C22C 38/004* (2013.01); *C22C 38/02* (2013.01); *C22C 38/04* (2013.01); *C22C 38/06* (2013.01); *C25D 3/12* (2013.01); *C25D 3/562* (2013.01); *C25D 5/12* (2013.01); *C21D 2251/02* (2013.01)

(56) References Cited

U.S. PATENT DOCUMENTS

| | | |
|---|---|---|
| 2020/0035960 A1 | 1/2020 | Nakano et al. |
| 2020/0321566 A1 | 10/2020 | Nakano et al. |
| 2021/0025071 A1 | 1/2021 | Saito et al. |
| 2022/0235482 A1 | 7/2022 | Nakano et al. |

FOREIGN PATENT DOCUMENTS

| | | |
|---|---|---|
| WO | 2019/083044 A1 | 5/2019 |
| WO | 2019/159794 A1 | 8/2019 |
| WO | 2020/222305 A1 | 11/2020 |

* cited by examiner

F I G. 8
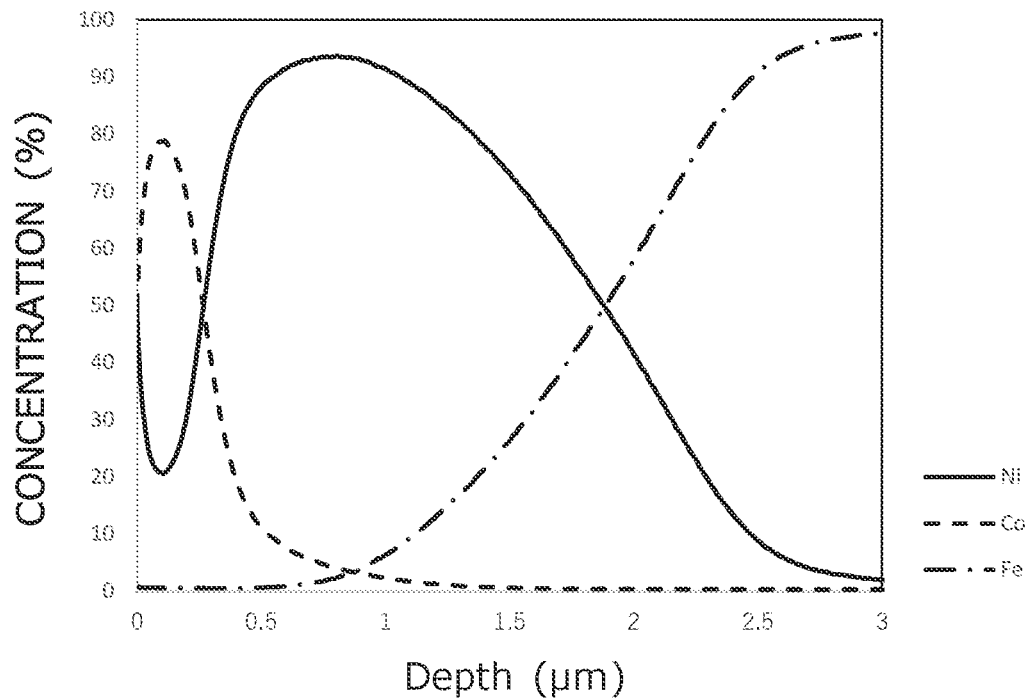
F I G. 9
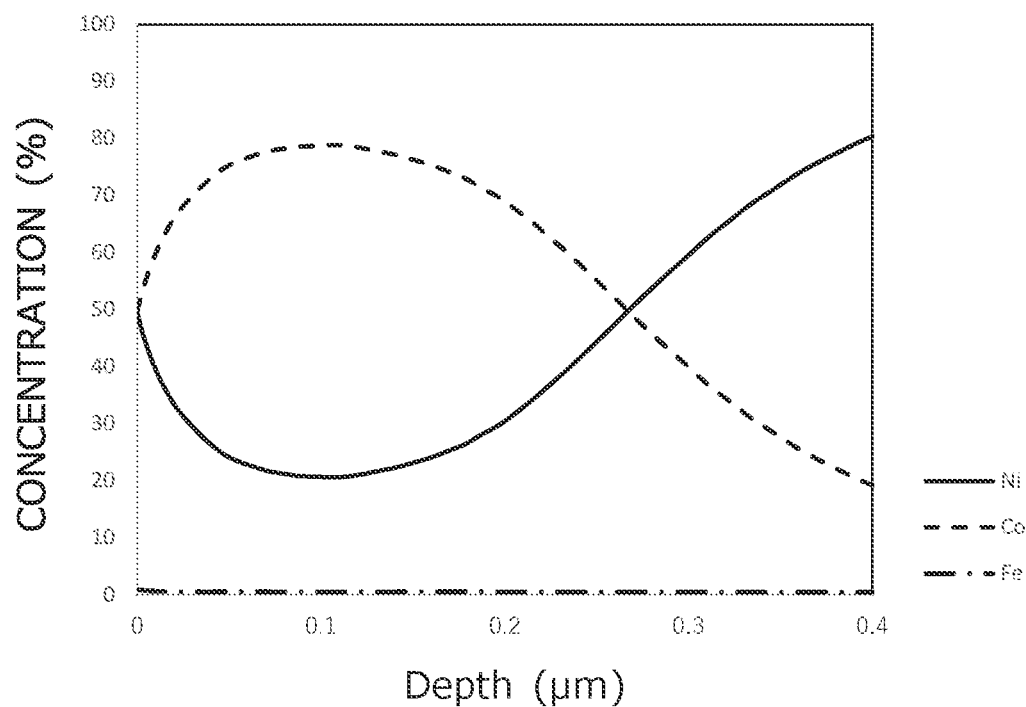

SURFACE-TREATED STEEL SHEET

TECHNICAL FIELD

The present disclosure relates to a surface-treated steel sheet.

BACKGROUND ART

A surface-treated steel sheet having nickel (Ni) plating on its surface is used as a surface-treated steel sheet for battery containers such as primary batteries and secondary batteries. For example, a common alkaline battery is manufactured as follows. First, a positive electrode can is manufactured by deep-drawing and pressing a surface-treated steel sheet into the shape of a battery container. Next, a conductive film, a positive electrode material, a separator, an electrolytic solution, a negative electrode material and a current collector are enclosed in the positive electrode can. In this way, an alkaline battery is manufactured. The positive electrode can function as a battery container and also functions as a current collector. The same also applies with respect to other types of batteries. The surface-treated steel sheet functions as a battery container and also functions as a current collector when connected to a negative electrode or a positive electrode.

On the other hand, the current required of a battery differs according to the intended application. A surface-treated steel sheet having an alloy layer on surface containing cobalt (Co) in addition to Ni is used for batteries for which a discharge with a large current (hereunder, also referred to as a "high-rate characteristic") is required. Co is an active metal in comparison to Ni. Therefore, by containing Co in an alloy layer, the contact resistance between the surface-treated steel sheet and a positive electrode material or a negative electrode material decreases. By this means, the function of the surface-treated steel sheet as a current collector can be enhanced. As a result, the high-rate characteristic of the battery is enhanced.

Surface-treated steel sheets for a battery that each include an alloy layer containing Ni and Co on the surface thereof and which are capable of improving the high-rate characteristic of a battery are disclosed, for example, in International Application Publication No. WO2019/159794 (Patent Literature 1), International Application Publication No. WO2012/147843 (Patent Literature 2), and International Application Publication No. WO2019/083044 (Patent Literature 3).

International Application Publication No. WO2019/159794 (Patent Literature 1) discloses a surface-treated steel sheet for a battery container that includes a Ni—Co—Fe-based diffusion alloy plating layer on at least one surface of a base steel sheet. The diffusion alloy plating layer is composed of, in order from the base steel sheet side, a Ni—Fe alloy layer and a Ni—Co—Fe alloy layer. In the diffusion alloy plating layer, the Ni coating weight is within a range of 3.0 g/m² or more to less than 8.74 g/m, the Co coating weight is within a range of 0.26 g/m or more to 1.6 g/m² or less, and the total of the Ni coating weight and the Co coating weight is less than 9.0 g/nm. When a surface of the diffusion alloy plating layer is analyzed using X-ray photoelectron spectroscopy, in atom %, Co is 19.5 to 60%, Fe is 0.5 to 30%, and Co+Fe is 20 to 70%. The thickness of the Ni—Fe alloy layer is within a range of 0.3 to 1.3 µm. It is described in Patent Literature 1 that, by this means, a surface-treated steel sheet for a battery container that is excellent in workability while maintaining battery characteristics and liquid leakage resistance is obtained.

International Application Publication No. WO2012/147843 (Patent Literature 2) discloses a surface-treated steel sheet for a battery container in which a nickel-cobalt alloy layer is formed at the outermost surface of a face that is to serve as the inner surface of a battery container. The surface-treated steel sheet for a battery container disclosed in Patent Literature 2 is characterized in that a Co/Ni value obtained by Auger electron spectroscopic analysis on the surface of the nickel-cobalt alloy layer is within a range of 0.1 to 1.5. It is described in Patent Literature 2 that, by this means, a surface-treated steel sheet for a battery container that is excellent in resistance to dissolving in alkaline solution, and that can secure high battery characteristics which are equal to or higher than those of conventional batteries even after the passage of time is obtained.

International Application Publication No. WO2019/083044 (Patent Literature 3) discloses a surface-treated steel sheet that includes a steel sheet and a nickel-cobalt-iron diffusion layer which is formed as an outermost outer layer on the steel sheet. In the surface-treated steel sheet disclosed in Patent Literature 3, when an Ni intensity, a Co intensity and an Fe intensity are measured consecutively in the depth direction from the surface side of the nickel-cobalt-iron diffusion layer by radio frequency glow discharge optical emission spectrometry, and a Ni content ratio, a Co content ratio and an Fe content ratio are determined based on the Ni intensity, the Co intensity and the Fe intensity, at a specific depth position D at which the Ni intensity is 0.5% with respect to a maximum value in the nickel-cobalt-iron diffusion layer, a Co content ratio $In_{Co\_D}$ is 5% by mass or more, and an Fe content ratio $In_{Fe\_D}$ is 11% by mass or more. It is described in Patent Literature 3 that, by this means, a surface-treated steel sheet is obtained that, when used as the battery container of a battery that uses a strong alkaline electrolytic solution, is excellent in battery characteristics and can suppress a decrease in the battery characteristics even after the passage of time.

CITATION LIST

Patent Literature

Patent Literature 1: International Application Publication No. WO2019/159794
Patent Literature 2: International Application Publication No. WO2012/147843
Patent Literature 3: International Application Publication No. WO²019/083044
Patent Literature 4: International Application Publication No. WO2018/181950

SUMMARY OF INVENTION

Technical Problem

In this connection, after being produced, surface-treated steel sheets are stored for a fixed period of time until being used. It is preferable that even when a surface-treated steel sheet has been stored for a fixed period of time, a change in the color of the surface of the surface-treated steel sheet is suppressed.

A surface-treated metal sheet that can prevent a change in the color of the surface thereof even when the surface-treated metal sheet is stored for a long period of time and can also improve the battery characteristics when used as a battery container is disclosed, for example, in International Application Publication No. WO2018/181950 (Patent Literature 4). The surface-treated metal sheet disclosed in Patent Literature 4 includes a metal sheet and a nickel-cobalt binary alloy layer that is formed on the metal sheet, in which, when a portion having a content ratio of oxygen atoms of 5 atom % or more as measured by X-ray photoelectron spectroscopy is taken as an oxide film, the nickel-cobalt binary alloy layer includes an oxide film having a thickness of 0.5 to 30 nm on the surface thereof, and an amount of increase in the thickness of the oxide film is 28 nm or less when a pressure cooker test is performed that includes raising the temperature, holding for 72 hours under a water-vapor atmosphere at a temperature of 105° C. and a relative humidity of 100% RH, and decreasing the temperature.

On the other hand, it is preferable that a change in the color of the surface of a surface-treated steel sheet can also be suppressed by a method that is different from the method disclosed in the aforementioned Patent Literature 4.

An objective to the present disclosure is to provide a surface-treated steel sheet which has low contact resistance and which can suppress the occurrence of a change in the color of the surface thereof.

Solution to Problem

A surface-treated steel sheet of the present disclosure includes:
a steel sheet, and
a Ni—Co—Fe alloy layer containing Ni, Co, and Fe on the steel sheet surface,
wherein:
in a thickness direction of the Ni—Co—Fe alloy layer, a Co concentration in the Ni—Co—Fe alloy layer is highest at a position which is on an outermost surface side of the Ni—Co—Fe alloy layer relative to a position where a Ni concentration in the Ni—Co—Fe alloy layer is highest, and which is between the outermost surface of the Ni—Co—Fe alloy layer and a depth of 100 nm from the outermost surface; and
the Ni—Co—Fe alloy layer includes:
between the outermost surface of the Ni—Co—Fe alloy layer and a position where the Co concentration is highest, an Ni-concentrated region in which the Ni concentration increases toward the outermost surface of the Ni—Co—Fe alloy layer.

Advantageous Effect of Invention

The surface-treated steel sheet of the present disclosure has low contact resistance and can suppress the occurrence of a change in the color of the surface thereof.

BRIEF DESCRIPTION OF DRAWINGS

FIG. 8 is a graph showing results of GDS analysis of a surface-treated steel sheet of Test Number 3 in the Examples.

FIG. 9 is an enlarged view of a range from a depth of 0 to 0.4 μm in the graph in FIG. 8.

DESCRIPTION OF EMBODIMENT

As described above, a surface-treated steel sheet having a nickel (Ni) plating layer has been used as a surface-treated steel sheet for battery containers. For applications for which a discharge with a large current (a high-rate characteristic) is required, surface-treated steel sheets having an alloy layer containing cobalt (Co) in addition to Ni have been proposed.

However, as a result of studies conducted by the present inventors, it has been found a surface-treated steel sheet including an alloy layer containing Co changes color under high temperature and high humidity conditions. The present inventors conducted detailed investigations to identify the cause of such a change in color, and obtained the following findings.

Co is more easily oxidized in comparison to Ni. Under high temperature and high humidity conditions, moisture such as condensation water adheres to the surface of the surface-treated steel sheet (that is, the outermost surface of the alloy layer). At the outermost surface of the alloy layer, the oxygen concentration of a portion which comes in contact with the moisture increases. In contrast, at the outermost surface of the alloy layer, the oxygen concentration of a portion which does not come in contact with the moisture is low. An oxygen concentration cell is formed between the portion where the oxygen concentration is high and the portion where the oxygen concentration is low. The Co of the portion where the oxygen concentration is low is oxidized by the oxygen concentration cell. The outermost surface of the alloy layer changes color due to the oxidized Co.

The present inventors considered that if oxidation of the Co in the outer layer of the alloy layer can be suppressed while also increasing the Co concentration in the outer layer of the alloy layer, the occurrence of a change in the color of the surface of the surface-treated steel sheet can be suppressed while decreasing the contact resistance of the surface-treated steel sheet.

Ni is chemically more stable than Co. The present inventors considered that if the Ni concentration in the outermost surface of the alloy layer is increased, oxidation of Co can be suppressed even in a case where an oxygen concentration cell is formed. By this means, the occurrence of a change in the color of a surface-treated steel sheet can be suppressed. However, if only the Ni concentration in the outermost surface of the alloy layer is increased, there is a possibility that the contact resistance of the surface-treated steel sheet will become large. Therefore, while also increasing the Co concentration in the outer layer of the alloy layer, the present inventors formed a region in which the Ni concentration increases toward the outermost surface of the alloy layer in the outer layer of the alloy layer. The present inventors considered that, by this means, oxidation of Co can be suppressed while keeping the contact resistance of the surface-treated steel sheet low.

Figure 1:
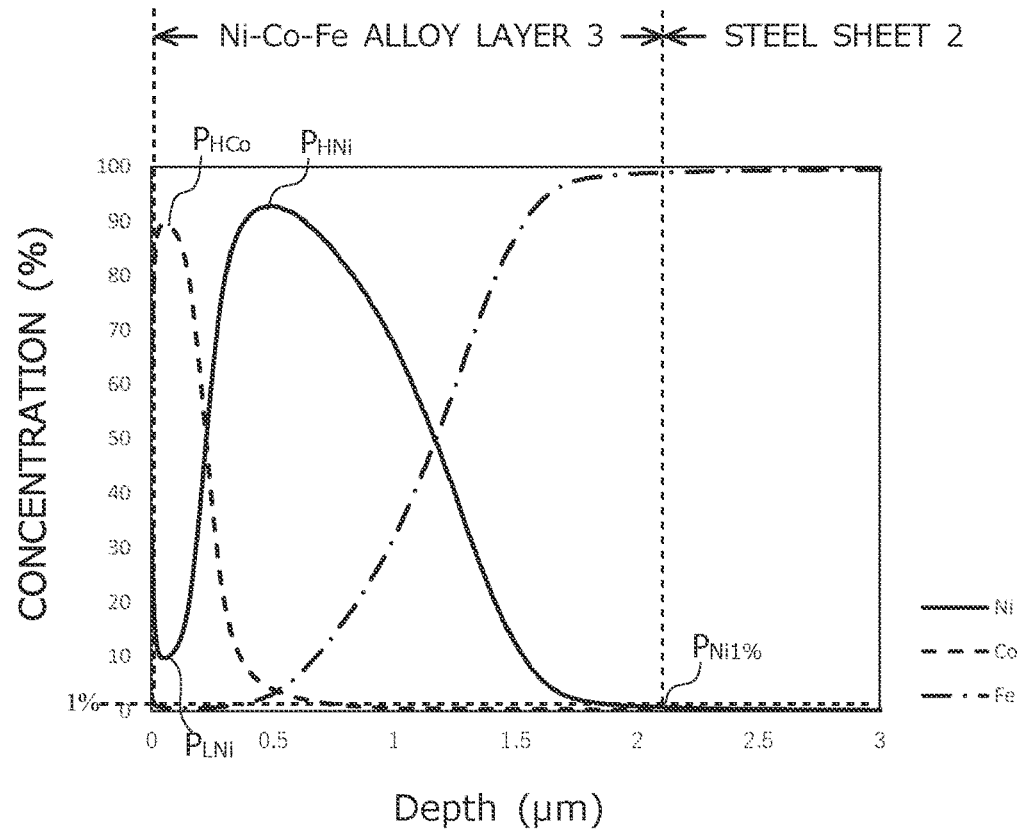
FIG. 1 is a graph showing results obtained by measuring the concentrations of Ni, Co, and Fe in a thickness direction of a surface-treated steel sheet of the present embodiment by glow discharge spectrometry (GDS) from the surface of the surface-treated steel sheet.

FIG. 1 is a graph showing results obtained by measuring the concentrations of Ni, Co, and Fe in the thickness direction of a surface-treated steel sheet of the present embodiment by glow discharge spectrometry (GDS) from the surface of the surface-treated steel sheet. The measurement conditions used for the GDS will be described later. FIG. 1 shows the results of GDS analysis on a surface-treated steel sheet of Test Number 1 in Examples that are described later. The axis of ordinates in FIG. 1 represents the concentrations (%) of Ni, Co, and Fe that were converted from emission intensities obtained by the GDS. The axis of abscissas in FIG. 1 represents the depth (μm) from the surface of the surface-treated steel sheet (that is, the outermost surface of the Ni—Co—Fe alloy layer) obtained by conversion from the Ar sputtering time.

Referring to FIG. 1, in a case where the concentrations of Ni, Co, and Fe are measured in the thickness direction of a surface-treated steel sheet by GDS from the surface of the surface-treated steel sheet, a region from the surface of the surface-treated steel sheet to a position $P_{Ni\%}$ where the Ni concentration becomes 1% is defined as an Ni—Co—Fe alloy layer 3. A method for determining the Ni concentration, Co concentration, and Fe concentration in the Ni—Co—Fe alloy layer 3 in the present description will be described later.

Referring to FIG. 1, the Ni concentration in the Ni—Co—Fe alloy layer 3 is highest at a position ($P_{HNi}$) that, in the thickness direction of the Ni—Co—Fe alloy layer 3, is between a steel sheet 2 and the outermost surface of the Ni—Co—Fe alloy layer 3. The Co concentration in the Ni—Co—Fe alloy layer 3 is highest at a position ($P_{HCo}$) that, in the thickness direction of the Ni—Co—Fe alloy layer 3, is on the outermost surface side of the Ni—Co—Fe alloy layer 3 relative to the position ($P_{HNi}$) where the Ni concentration in the Ni—Co—Fe alloy layer 3 is highest.

Figure 2:
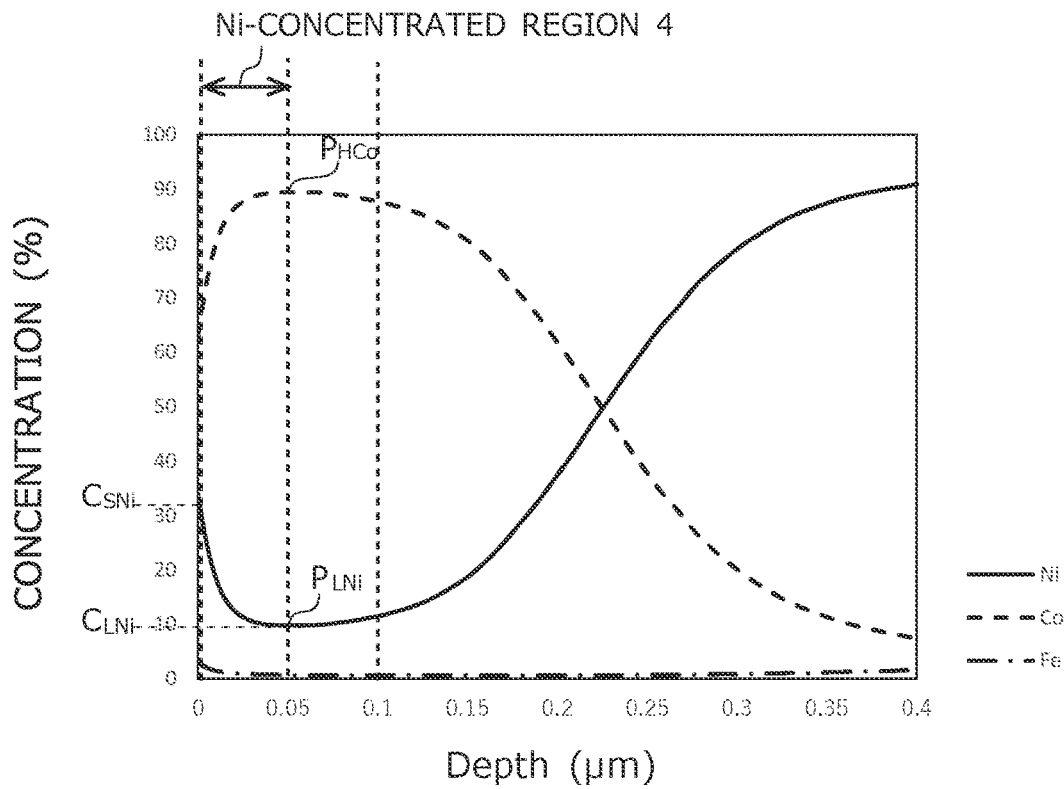
FIG. 2 is an enlarged view of a range from a depth of 0 to 0.4 μm in the graph in FIG. 1.

FIG. 2 is an enlarged view of a range from a depth of 0 to 0.4 μm in the graph in FIG. 1. Referring to FIG. 2, in the thickness direction of the Ni—Co—Fe alloy layer 3, the Co concentration in the Ni—Co—Fe alloy layer 3 is highest at a position ($P_{HCo}$) between the outermost surface of the Ni—Co—Fe alloy layer 3 and a depth of 100 nm. By this means, the Co concentration in the outer layer of the Ni—Co—Fe alloy layer 3 can be increased. As a result, the contact resistance of the surface-treated steel sheet can be lowered.

Referring to FIG. 2, in the Ni—Co—Fe alloy layer 3, an Ni-concentrated region 4 is formed between the outermost surface of the Ni—Co—Fe alloy layer 3 and the position ($P_{HCo}$) where the Co concentration is highest. In the Ni-concentrated region 4, the Ni concentration increases toward the outermost surface of the Ni—Co—Fe alloy layer 3. By this means, the Ni concentration in the vicinity of the outermost surface of the Ni—Co—Fe alloy layer 3 can be increased. As a result, oxidation of Co in the Ni—Co—Fe alloy layer 3 is suppressed, and the occurrence of a change in the color of the surface of the surface-treated steel sheet can be suppressed.

By adopting the structure described above, while increasing the Co concentration in the outer layer of the Ni—Co—Fe alloy layer 3, the Ni concentration in the vicinity of the outermost surface of the Ni—Co—Fe alloy layer 3 can also be increased. By this means, while maintaining the contact resistance of the surface-treated steel sheet at a low level, the occurrence of a change in the color of the surface of the surface-treated steel sheet can be suppressed.

The surface-treated steel sheet of the present disclosure has been completed based on the above findings, and is as follows.

[1]

A surface-treated steel sheet, including:

a steel sheet, and an Ni—Co—Fe alloy layer containing Ni, Co, and Fe on the steel sheet surface, wherein:

in a thickness direction of the Ni—Co—Fe alloy layer, a Co concentration in the Ni—Co—Fe alloy layer is highest at a position which is on an outermost surface side of the Ni—Co—Fe alloy layer relative to a position where an Ni concentration in the Ni—Co—Fe alloy layer is highest, and which is between the outermost surface of the Ni—Co—Fe alloy layer and a depth of 100 nm from the outermost surface; and the Ni—Co—Fe alloy layer includes:

between the outermost surface of the Ni—Co—Fe alloy layer and a position where the Co concentration is highest, an Ni-concentrated region in which the Ni concentration increases toward the outermost surface of the Ni—Co—Fe alloy layer.

Here, the term "Ni—Co—Fe alloy layer 3" refers to a region which, in a case where the concentrations of Ni, Co, and Fe are measured from the surface of the surface-treated steel sheet in the thickness direction of the surface-treated steel sheet by GDS that is described later, is from the surface of the surface-treated steel sheet to a position at which the Ni concentration becomes 1%. In the present description, the phrase "surface of the surface-treated steel sheet" and the phrase "outermost surface of the Ni—Co—Fe alloy layer 3" have the same meaning. Further, the terms "Ni concentration", "Co concentration" and "Fe concentration" of the Ni—Co—Fe alloy layer 3 refer to a proportion (%) of Ni, a proportion (%) of Co, and a proportion (%) of Fe, respectively, in a case where a sum of the content of Ni in percent by mass, the content of Co in percent by mass, and the content of Fe in percent by mass that are obtained by conversion from emission intensities of Ni, Co, and Fe obtained in analysis by GDS, which is described later, is taken as 100%. Further, the term "Ni-concentrated region 4" refers to a region which, in the thickness direction of the Ni—Co—Fe alloy layer 3, is between the outermost surface of the Ni—Co—Fe alloy layer 3 and a position where the Ni concentration is lowest within a range from a position where the Ni concentration is highest to the outermost surface of the Ni—Co—Fe alloy layer 3, and to a region in which the Ni concentration increases toward the outermost surface of the Ni—Co—Fe alloy layer 3.

[2]

The surface-treated steel sheet according to [1], wherein:
in the thickness direction of the Ni—Co—Fe alloy layer, at the position at which the Co concentration is highest, a ratio of the Co concentration to the Ni concentration is 3.0 or more.

[3]

The surface-treated steel sheet according to [1] or [2], wherein:
per side of the steel sheet, a content of Ni in the Ni—Co—Fe alloy layer is 1.34 to 5.36 g/m$^2$, and a content of Co in the Ni—Co—Fe alloy layer is 0.45 to 1.34 g/m$^2$.

[4]

The surface-treated steel sheet according to [1] or [2], wherein:
per side of the steel sheet, a content of Ni in the Ni—Co—Fe alloy layer is 5.36 to 35.6 g/m$^2$, and a content of Co in the Ni—Co—Fe alloy layer is 0.45 to 1.34 g/m.

Hereunder, the surface-treated steel sheet of the present embodiment is described in detail.

[Surface-Treated Steel Sheet]

Figure 3:
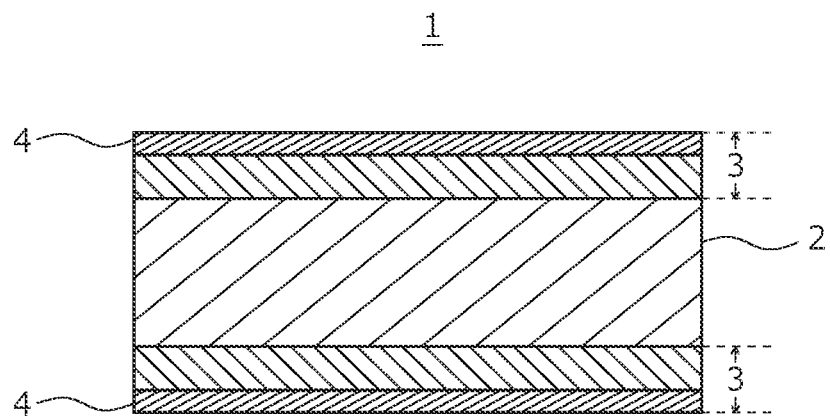
FIG. 3 is a cross-sectional diagram illustrating one example of a surface-treated steel sheet of the present embodiment.
Figure 4:
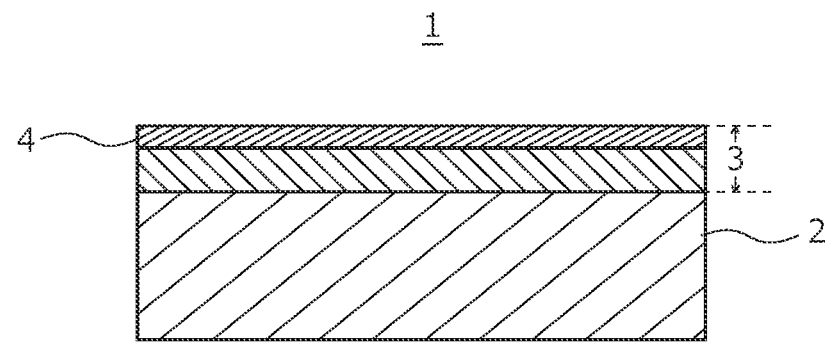
FIG. 4 is a cross-sectional diagram illustrating one example of a surface-treated steel sheet of another embodiment that is different from the example in FIG. 3.

A surface-treated steel sheet of the present embodiment includes a steel sheet, and an Ni—Co—Fe alloy layer 3 containing Ni, Co, and Fe on the steel sheet surface. FIG. 3 is a cross-sectional diagram illustrating one example of the surface-treated steel sheet of the present embodiment. Referring to FIG. 3, a surface-treated steel sheet 1 of the present embodiment includes the steel sheet 2 and the Ni—Co—Fe alloy layer 3. The Ni—Co—Fe alloy layer 3 is arranged on a surface of the steel sheet 2. In FIG. 3, the Ni—Co—Fe alloy layer 3 is arranged on both sides of the steel sheet 2. However, the arrangement of the Ni—Co—Fe alloy layer 3 is not limited to the example illustrated in FIG. 3. As illustrated in FIG. 4, the Ni—Co—Fe alloy layer 3 may be arranged on only one side of the steel sheet 2.

Figure 5:
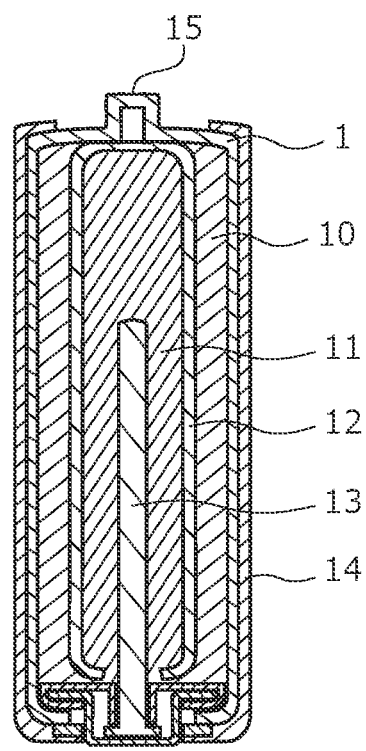
FIG. 5 is a cross-sectional diagram illustrating an example of an alkaline battery which uses the surface-treated steel sheet of the present embodiment.

The surface-treated steel sheet 1 of the present embodiment can be used for battery applications, such as for primary batteries and secondary batteries. The term "primary battery" refers to, for example, an alkaline battery and a manganese battery. The term "secondary battery" refers to, for example, a lithium ion battery. FIG. 5 is a cross-sectional diagram illustrating an example of an alkaline battery which uses the surface-treated steel sheet 1 of the present embodiment. Referring to FIG. 5, the surface-treated steel sheet 1 is processed into the shape of a battery container. A manganese dioxide 10 that is the positive electrode, zinc 11 that is the negative electrode, a separator 12, and a current collector 13 are enclosed inside the container formed of the surface-treated steel sheet 1. The positive electrode 10 and the negative electrode 11 are immersed in an electrolytic solution. The outer side of the container formed by the surface-treated steel sheet 1 is covered with an insulator 14. A protrusion at the top part of the alkaline battery in FIG. 5 is a positive electrode terminal 15. When used as a battery container, the surface-treated steel sheet 1 functions as a battery container and as a current collector. In a case where the Ni—Co—Fe alloy layer 3 is arranged on only one side of the steel sheet 2, it is preferable that the Ni—Co—Fe alloy layer 3 is arranged on the inner side of the battery container.

[Preferable Thickness of Surface-Treated Steel Sheet]

Although the thickness of the surface-treated steel sheet 1 of the present embodiment is not particularly limited, for example the thickness is 0.05 to 1.5 mm. In the case of use for a battery such as an alkaline battery, for example, the thickness is 0.1 to 1.0 mm. The thickness of the surface-treated steel sheet 1 can be measured by a well-known method. The thickness of the surface-treated steel sheet 1, for example, may be measured using a micrometer.

[Ni—Co—Fe Alloy Layer]

The Ni—Co—Fe alloy layer 3 contains Ni, Co, and Fe. Each of the Ni, Co, and Fe may be partially present in the thickness direction of the Ni—Co—Fe alloy layer 3, or may be present over the entire thickness direction of the Ni—Co—Fe alloy layer 3. In other words, in the surface-treated steel sheet 1 of the present embodiment, Ni, Co, and Fe need not be constantly contained over the whole area in the thickness direction of the Ni—Co—Fe alloy layer 3.

Referring to FIG. 1, the boundary between the steel sheet 2 and the Ni—Co—Fe alloy layer 3 is a position ($P_{Ni1\%}$) where the Ni concentration is 1%. In other words, the position ($P_{Ni1\%}$) where the Ni concentration is 1% is the surface of the steel sheet 2. The Ni concentration increases in the direction from the surface of the steel sheet 2 toward the outermost surface of the Ni—Co—Fe alloy layer 3, and the Ni concentration is highest at a certain position ($P_{HNi}$). In the thickness direction of the Ni—Co—Fe alloy layer 3, the Co concentration in the Ni—Co—Fe alloy layer is highest ($P_{HCo}$) on the outermost surface side of the Ni—Co—Fe alloy layer 3 relative to the position ($P_{HNi}$) where the Ni concentration in the Ni—Co—Fe alloy layer 3 is highest.

FIG. 2 is an enlarged view of a range from a depth of 0 to 0.4 pam in the graph in FIG. 1. Referring to FIG. 2, in the thickness direction of the Ni—Co—Fe alloy layer 3, the Co concentration in the Ni—Co—Fe alloy layer 3 is highest between the outermost surface of the Ni—Co—Fe alloy layer 3 and a depth of 100 nm from the outermost surface. In the present description, the region from the outermost surface of the Ni—Co—Fe alloy layer 3 to a depth of 100 nm in the thickness direction of the Ni—Co—Fe alloy layer 3 is also referred to as the "outer layer" of the Ni—Co—Fe alloy layer 3.

In FIG. 2, the Co concentration in the Ni—Co—Fe alloy layer 3 is highest at a depth of approximately 50 nm from the outermost surface of the Ni—Co—Fe alloy layer 3. However, the position ($P_{HCo}$) where the Co concentration in the Ni—Co—Fe alloy layer 3 is highest is not limited to the position shown in FIG. 2. It suffices that the Co concentration in the Ni—Co—Fe alloy layer 3 is highest at a position that is between the outermost surface of the Ni—Co—Fe alloy layer 3 and a depth of 100 nm from the outermost surface.

In the thickness direction of the Ni—Co—Fe alloy layer 3, if the Co concentration is highest at a position which is on the outermost surface side of the Ni—Co—Fe alloy layer 3 relative to the position ($P_{HNi}$) where the Ni concentration is highest and which is in the outer layer of the Ni—Co—Fe alloy layer 3, the contact resistance of the surface-treated steel sheet 1 can be lowered. By this means, a battery in which the surface-treated steel sheet 1 is used can discharge with a large current.

[Preferable Thickness of Ni—Co—Fe Alloy Layer]

The thickness of the Ni—Co—Fe alloy layer 3 is not particularly limited, and is appropriately set according to the intended use. The thickness of the Ni—Co—Fe alloy layer 3 is, for example, 0.1 to 10.0 μm. When the intended use is for an alkaline battery, the thickness of the Ni—Co—Fe alloy layer 3 is, for example, 0.1 to 5.0 μm.

[Method for Identifying Ni—Co—Fe Alloy Layer and Method for Identifying Thickness]

The Ni—Co—Fe alloy layer 3 is identified by the following method. The Ni concentration, Co concentration, and Fe concentration are measured by glow discharge spectrometry (GDS) in the thickness direction of the surface-treated steel sheet 1 from the surface of the surface-treated steel sheet 1. A radio-frequency glow discharge optical emission spectrometer (manufactured by Horiba Ltd., model: GD-Profiler 2) is used for the measurement. The emission intensity of Ni, the emission intensity of Co, and the emission intensity of Fe are converted to the content of Ni (mass %), content of Co (mass %), and content of Fe (mass %), respectively. A sum of the obtained content of Ni (mass %), content of Co (mass %), and content of Fe (mass %) is taken as 100%, and the proportion (%) of Ni, the proportion (%) of Co, and proportion (%) of Fe are determined. The obtained proportion (%) of Ni, proportion (%) of Co and proportion (%) of Fe are adopted as the Ni concentration (%), Co concentration (%), and Fe concentration (%), respectively. The GDS measurement conditions are as follows.

H.V.: 785 V for Fe, 630 V for Ni, 720 V for Co
Anode diameter: φ 4 mm
Gas: Ar
Gas pressure: 600 Pa
Output: 35 W Measurement data for which the depth obtained by conversion from the Ar sputtering time is less than 0.006 μm (6 mm) may sometimes include noise due to reasons such as the signal being unstable. In other words, in the case of measurement data for which the depth obtained by conversion from the Ar sputtering time is less than 0.006 μm (6 nm), the Ni—Co—Fe alloy layer 3 may not necessarily be accurately measured. Therefore, in the GDS measurement of the surface-treated steel sheet 1 of the present embodiment, only data for which the depth obtained by conversion from the Ar sputtering time is 0.006 μm or more is used. Specifically, a point at which the depth obtained by conversion from the Ar sputtering time first becomes 0.006 μm or more is taken as a depth of 0 μm.

GDS measurement is performed under the aforementioned conditions, and a region from the surface of the surface-treated steel sheet 1 to a position ($P_{Ni1\%}$) where the Ni concentration is 1% is taken as the Ni—Co—Fe alloy layer 3. If multiple positions where the Ni concentration is 1% exist, a position where the Ni concentration is 1% that is furthest on the steel sheet 2 side is taken as the boundary between the Ni—Co—Fe alloy layer 3 and the steel sheet 2. The distance from the surface of the surface-treated steel sheet 1 to the position where the Ni concentration is 1% is taken as the thickness (μm) of the Ni—Co—Fe alloy layer 3. Further, a position ($P_{HNi}$) where the Ni concentration is highest and a position ($P_{HCo}$) where the Co concentration is highest in the thickness direction of the Ni—Co—Fe alloy layer 3 are identified. Furthermore, it is confirmed that the Co concentration is highest at a position which, in the thickness direction of the Ni—Co—Fe alloy layer 3, is on the outermost surface side of the Ni—Co—Fe alloy layer 3 relative to the position where the Ni concentration is highest.

[Ni-Concentrated Region]

Referring to FIG. 2, the Ni—Co—Fe alloy layer 3 includes the Ni-concentrated region 4. The term "Ni-concentrated region 4" refers to a region which, in the thickness direction of the Ni—Co—Fe alloy layer 3, is between the outermost surface of the Ni—Co—Fe alloy layer 3 and a position ($P_{LNi}$) where the Ni concentration is lowest within a range from a position ($P_{HNi}$) where the Ni concentration is highest to the outermost surface of the Ni—Co—Fe alloy layer 3, and to a region in which the Ni concentration increases toward the outermost surface of the Ni—Co—Fe alloy layer 3. In the present embodiment, the Ni-concentrated region 4 is located between the outermost surface of the Ni—Co—Fe alloy layer 3 and the position ($P_{HCo}$) where the Co concentration is highest. Thus, the Ni concentration in the vicinity of the outermost surface of the Ni—Co—Fe alloy layer 3 can be increased. As a result, oxidation of Co in the outer layer of the Ni—Co—Fe alloy layer 3 is suppressed, and the occurrence of a change in the color of the surface of the surface-treated steel sheet can be suppressed. Note that, the highest Ni concentration in the Ni-concentrated region 4 is lower than the highest Ni concentration in the Ni—Co—Fe alloy layer 3.

Referring to FIG. 1, the Ni concentration decreases in the direction from the position ($P_{HNi}$) where the Ni concentration in the Ni—Co—Fe alloy layer 3 is highest toward the outermost surface of the Ni—Co—Fe alloy layer 3. Further, at a position ($P_{LNi}$) that is between the position ($P_H$Ni) where the Ni concentration in the Ni—Co—Fe alloy layer 3 is highest and the outermost surface of the Ni—Co—Fe alloy layer 3, the Ni concentration becomes a minimal value. The Ni concentration increases from the point ($P_{LNi}$) where the Ni concentration is the minimal value to the outermost surface of the Ni—Co—Fe alloy layer 3. In the Ni-concentrated region 4 of the surface-treated steel sheet 1 of the present embodiment, the Ni concentration continues to increase up to the outermost surface of the Ni—Co—Fe alloy layer 3. In the Ni-concentrated region 4, in the direction toward the outermost surface of the Ni—Co—Fe alloy layer 3 from the point ($P_{LNi}$) where the Ni concentration is a minimal value, although the Ni concentration may temporarily not change, the Ni concentration does not decrease. The reason is that if the Ni concentration were to decrease in the Ni-concentrated region 4, the function of suppressing oxidation of the surface of the surface-treated steel sheet 1 would decrease, and consequently there would be a risk that the surface of the surface-treated steel sheet 1 would change color.

Referring to FIG. 1 and FIG. 2, the position ($P_{HCo}$) where the Co concentration in the Ni—Co—Fe alloy layer 3 is highest and the position ($P_{LNi}$) where the Ni concentration is a minimal value coincide. However, in some cases, depending on the diffusion state of Fe in the Ni—Co—Fe alloy layer 3, the position ($P_{HCo}$) where the Co concentration is highest and the position ($P_{LNi}$) where the Ni concentration is a minimal value do not coincide.

[Preferable Thickness of Ni-Concentrated Region]

If the thickness of the Ni-concentrated region 4 is 0.01 μm or more, the Ni concentration in the vicinity of the outermost surface of the Ni—Co—Fe alloy layer 3 can be stably increased. As a result, oxidation of Co in the Ni—Co—Fe alloy layer 3 can be suppressed more stably. On the other hand, if the thickness of the Ni-concentrated region 4 is 0.15 μm or less, the Co concentration in the outer layer of the Ni—Co—Fe alloy layer is kept relatively high. As a result, the contact resistance of the surface-treated steel sheet 1 can be more stably lowered. Accordingly, the thickness of the Ni-concentrated region 4 is preferably 0.01 to 0.15 μm. A more preferable lower limit of the thickness of the Ni-concentrated region 4 is 0.02 μm, further preferably is 0.03 μm, further preferably is 0.04 μm, further preferably is 0.05 μm, and further preferably is 0.06 m. A more preferable upper limit of the thickness of the Ni-concentrated region 4 is 0.12 μm, further preferably is 0.11 μm, further preferably is 0.10 μm, further preferably is 0.09 μm, further preferably is 0.08 μm, further preferably is 0.07 μm, and further preferably is 0.06 μm.

[Method for Identifying Ni-Concentrated Region and Method for Measuring Thickness Thereof]

The thickness of the Ni-concentrated region 4 is measured by the following method. First, the surface-treated steel sheet 1 is subjected to GDS measurement by the method described above. A region is identified, which, in the thickness direction of the Ni—Co—Fe alloy layer 3, is between the outermost surface of the Ni—Co—Fe alloy layer 3 and a position ($P_{LNi}$) where the Ni concentration is lowest within a range from a position ($P_{HNi}$) where the Ni concentration is highest to the outermost surface of the Ni—Co—Fe alloy layer 3, and in which region the Ni concentration increases toward the outermost surface of the Ni—Co—Fe alloy layer 3. The thickness of this region is defined as the thickness (μm) of the Ni-concentrated region 4. In other words, a distance in the thickness direction of the Ni—Co—Fe alloy layer 3 from the aforementioned position ($P_{LNi}$) where the Ni concentration becomes a minimal value to the outermost surface of the Ni—Co—Fe alloy layer 3 is defined as the thickness (μm) of the Ni-concentrated region 4.

[Preferable Ni Concentration in Outermost Surface of Ni—Co—Fe Alloy Layer]

If the Ni concentration in the outermost surface of the Ni—Co—Fe alloy layer 3 is 10% or more, the occurrence of a change in the color of the surface-treated steel sheet 1 can be suppressed more stably. On the other hand, if the Ni concentration in the outermost surface of the Ni—Co—Fe alloy layer 3 is 90% or less, low contact resistance of the surface-treated steel sheet 1 can be more stably maintained. Therefore, the Ni concentration in the outermost surface of the Ni—Co—Fe alloy layer 3 is preferably 10 to 90%. A more preferable lower limit of the Ni concentration in the outermost surface of the Ni—Co—Fe alloy layer 3 is 20%, and further preferably is 30%. A more preferable upper limit of the Ni concentration in the outermost surface of the Ni—Co—Fe alloy layer 3 is 80%, further preferably is 70%, further preferably is 60%, and further preferably is 55%.

The Ni concentration in the outermost surface of the Ni—Co—Fe alloy layer 3 is the Ni concentration at the initial depth at which a depth obtained by conversion from the Ar sputtering time is 0.006 μm or more when the Ni concentration, Co concentration, and Fe concentration are measured by GDS according to the method described above. As described above, in the case of measurement data for which the depth obtained by conversion from the Ar sputtering time is less than 0.006 μm, the Ni—Co—Fe alloy layer 3 may not necessarily be accurately measured, and for this reason such measurement data is removed from the object of analysis,

[Preferable Co Concentration/Ni Concentration Ratio]

Preferably, at the position ($P_{HCo}$) where the Co concentration is highest in the thickness direction of the Ni—Co—Fe alloy layer 3, a ratio of the Co concentration to the Ni concentration is 0.5 or more. If the ratio of the Co concentration to the Ni concentration is high at the position ($P_{HCo}$) where the Co concentration is highest, the contact resistance of the surface-treated steel sheet 1 can be easily maintained at a low level. Therefore, at the position ($P_{HCo}$) where the Co concentration is highest in the thickness direction of the Ni—Co—Fe alloy layer 3, a more preferable lower limit of the ratio of the Co concentration to the Ni concentration is 1.0, further preferably is 2.0, further preferably is 3.0, further preferably is 4.0, further preferably is 5.0, and further preferably is 5.5. An upper limit of the ratio of the Co concentration to the Ni concentration at the position ($P_{HCo}$) where the Co concentration is highest in the thickness direction of the Ni—Co—Fe alloy layer is 10.0, more preferably is 9.5, and further preferably is 9.0.

[Method for Measuring Co Concentration/Ni Concentration Ratio]

The Co concentration/Ni concentration ratio is measured by the following method. First, GDS measurement is performed by the method described above. The Ni concentration and Co concentration are measured at the position ($P_{HCo}$) where the Co concentration is highest in the thickness direction of the Ni—Co—Fe alloy layer. The obtained Co concentration is divided by the Ni concentration to calculate the Co concentration/Ni concentration ratio.

Referring to FIG. 1, the Fe concentration in the Ni—Co—Fe alloy layer 3 decreases in the direction from the steel sheet 2 toward the outermost surface of the Ni—Co—Fe alloy layer 3. Hereunder, a case where Fe is diffused up to the outermost surface of the Ni—Co—Fe alloy layer 3 is also referred to as "complete diffusion". Further, a case where Fe is not diffused up to the outermost surface of the Ni—Co—Fe alloy layer 3 is also referred to as "partial diffusion". In the Ni—Co—Fe alloy layer 3 of the surface-treated steel sheet 1 of the present embodiment, Fe may be completely diffused or may be partially diffused.

[Preferable Content of Ni and Preferable Content of Co in Ni—Co—Fe Alloy Layer 3]

Preferably, the content of Ni and the content of Co in the Ni—Co—Fe alloy layer 3 per side of the steel sheet 2 are as follows.

Content of Ni in Ni—Co—Fe Alloy Layer 3: 1.34 to 35.6 g/m$^2$

If the content of Ni in the Ni—Co—Fe alloy layer 3 is 1.34 g/m$^2$ or more, an ann-rust property of the surface-treated steel sheet 1 is enhanced. On the other hand, even if the content of Ni in the Ni—Co—Fe alloy layer 3 is more than 35.6 g/m$^2$, the anti-rust property of the surface-treated steel sheet 1 will be saturated. If the content of Ni in the Ni—Co—Fe alloy layer 3 is 35.6 g/m$^2$ or less, the cost can be suppressed. Therefore, the content of Ni in the Ni—Co—Fe alloy layer 3 is preferably 1.34 to 35.6 g/m$^2$. A more preferable lower limit of the content of Ni in the Ni—Co—Fe alloy layer 3 is 5.36 g/m$^2$, and further preferably is 8.93 g/m. A more preferable upper limit of the content of Ni in the Ni—Co—Fe alloy layer 3 is 26.8 g/m$^2$, and further preferably is 17.9 g/m$^2$.

Content of Co in Ni—Co—Fe Alloy Layer 3: 0.45 to 1.34 g/m$^2$

When the content of Co in the Ni—Co—Fe alloy layer 3 is 0.45 g/m$^2$ or more, the contact resistance of the surface-treated steel sheet 1 can be easily maintained at a low level. On the other hand, when the content of Co in the Ni—Co—Fe alloy layer 3 is 1.34 g/m$^2$ or less, the resistance of the Ni—Co—Fe alloy layer 3 to dissolution in an alkaline electrolytic solution will increase. Therefore, the content of Co in the Ni—Co—Fe alloy layer 3 is preferably 0.45 to 1.34 g/m$^2$. A more preferable lower limit of the content of Co in the Ni—Co—Fe alloy layer 3 is 0.54 g/m$^2$, and further preferably is 0.63 g/m$^2$. A more preferable upper limit of the content of Co in the Ni—Co—Fe alloy layer 3 is 1.11 g/m$^2$, and further preferably is 0.89 g/m$^2$.

[Preferable Content of Ni and Preferable Content of Co in Ni—Co—Fe Alloy Layer 3 in Case of Complete Diffusion]

In the case of complete diffusion, preferably the content of Ni and the content of Co in the Ni—Co—Fe alloy layer 3 per side of the steel sheet 2 are as follows.

Content of Ni in Ni—Co—Fe Alloy Layer 3 in Case of Complete Diffusion: 1.34 to 5.36 g/m$^2$ If the content of Ni in the Ni—Co—Fe alloy layer 3 is 134 g/m² or more, an anti-rust property of the surface-treated steel sheet 1 is enhanced. On the other hand, if the content of Ni in the Ni—Co—Fe alloy layer 3 is 5.36 g/m² or less, it is easy for Fe to diffuse up to the outermost surface of the Ni—Co—Fe alloy layer 3. Therefore, when Fe is to be completely diffused in the Ni—Co—Fe alloy layer 3, the content of Ni in the Ni—Co—Fe alloy layer 3 is preferably 1.34 to 5.36 g/m². In the case of complete diffusion, a more preferable lower limit of the content of Ni in the Ni—Co—Fe alloy layer 3 is 2.23 g/m², and further preferably is 3.12 g/m². In the case of complete diffusion, a more preferable upper limit of the content of Ni in the Ni—Co—Fe alloy layer 3 is 4.45 g/m², and further preferably is 356 g/m².

Content of Co in Ni—Co—Fe Alloy Layer 3 in Case of Complete Diffusion: 0.45 to 1.34 g/m²

If the content of Co in the Ni—Co—Fe alloy layer 3 is 0.45 g/m² or more, the contact resistance of the surface-treated steel sheet 1 can be easily maintained at a low level. On the other hand, if the content of Co in the Ni—Co—Fe alloy layer 3 is 1.34 g/m² or less, the resistance of the Ni—Co—Fe alloy layer 3 to dissolution in an alkaline electrolytic solution will increase. Therefore, the content of Co in the Ni—Co—Fe alloy layer 3 in the case of complete diffusion is preferably 0.45 to 1.34 g/m². A more preferable lower limit of the content of Co in the Ni—Co—Fe alloy layer 3 in the case of complete diffusion is 0.54 g/n, and further preferably is 0.63 g/m². A more preferable upper limit of the content of Co in the Ni—Co—Fe alloy layer 3 in the case of complete diffusion is 1.11 g/m², and further preferably is 0.89 g/n.

[Preferable Content of Ni and Preferable Content of Co in Ni—Co—Fe Alloy Layer 3 in Case of Partial Diffusion]

In the case of partial diffusion, preferably the content of Ni and the content of Co in the Ni—Co—Fe alloy layer 3 per side of the steel sheet 2 are as follows.

Content of Ni in Ni—Co—Fe Alloy Layer 3 in Case of Partial Diffusion: 5.36 to 35.6 g/m²

If the content of Ni in the Ni—Co—Fe alloy layer 3 is 5.36 g/m² or more, it will be easy to produce the Ni—Co—Fe alloy layer 3 in which Fe is partially diffused. On the other hand, if the content of Ni in the Ni—Co—Fe alloy layer 3 is 35.6 g/m² or less, the cost can be suppressed. Therefore, in a case where Fe is to be partially diffused in the Ni—Co—Fe alloy layer 3, the content of Ni in the Ni—Co—Fe alloy layer 3 is preferably 5.36 to 35.6 g/m². In the case of partial diffusion, a more preferable lower limit of the content of Ni in the Ni—Co—Fe alloy layer 3 is 8.93 g/m², and further preferably is 17.9 g/m². In the case of partial diffusion, a more preferable upper limit of the content of Ni in the Ni—Co—Fe alloy layer 3 is 31.3 g/m², and further preferably is 22.3 g/m².

Content of Co in Ni—Co—Fe Alloy Layer 3 in Case of Partial Diffusion: 0.45 to 1.34 g/m²

If the content of Co in the Ni—Co—Fe alloy layer 3 is 0.45 g/m² or more, the contact resistance of the surface-treated steel sheet 1 can be easily maintained at a low level. On the other hand, if the content of Co in the Ni—Co—Fe alloy layer 3 is 1.34 g/m² or less, the resistance of the Ni—Co—Fe alloy layer 3 to dissolution in an alkaline electrolytic solution will increase. Therefore, the content of Co in the Ni—Co—Fe alloy layer 3 in the case of partial diffusion is preferably 0.45 to 1.34 g/m². A more preferable lower limit of the content of Co in the Ni—Co—Fe alloy layer 3 in the case of partial diffusion is 0.54 g/m², and further preferably is 0.63 g/m². A more preferable upper limit of the content of Co in the Ni—Co—Fe alloy layer 3 in the case of partial diffusion is 1.11 g/m², and further preferably is 0.89 g/m².

The chemical composition of the Ni—Co—Fe alloy layer 3 of the surface-treated steel sheet 1 of the present embodiment may be a chemical composition consisting of Ni, Co, Fe and impurities. The impurities are, for example, one or more elements selected from the group consisting of carbon (C), oxygen (O), aluminum (Al), silicon (Si), phosphorus (P), and sulfur (S). In some cases, for example, the impurities are contained in an amount of 0.1% by mass or less in total.

[Method for Measuring Content of Ni and Content of Co in Ni—Co—Fe Alloy Layer]

The content of Ni and content of Co in the Ni—Co—Fe alloy layer 3 are measured by the following method. First, the surface-treated steel sheet 1 including the Ni—Co—Fe alloy layer 3 is prepared. Next, the Ni—Co—Fe alloy layer 3 of the surface-treated steel sheet 1 is subjected to elemental analysis using a fluorescent X-ray analyzer. The fluorescent X-ray analyzer is used to prepare a calibration curve in advance using a standard sample having a known content of Ni and a standard sample having a known content of Co. The content of Ni (g/m²) and the content of Co (g/m²) in the Ni—Co—Fe alloy layer 3 are determined based on the calibration curve.

[Impedance]

An impedance value (Ω) of the surface-treated steel sheet 1 of the present embodiment is preferably 50 (Ω) or less. Here, the term "impedance value (Ω)" refers to an impedance value (Ω) at a frequency of 0.1 Hz, which is measured after the surface-treated steel sheet 1 is held at a constant potential for 10 days at 0.3 V vs. Hg/HgO in a 35% KOH aqueous solution at 60° C. The upper limit of the impedance value (Ω) is more preferably 45, further preferably is 40, further preferably is 30, further preferably is 20, further preferably is 10, and further preferably is 5. The lower limit of the impedance value (Ω) is not particularly limited, and for example is 1.

[Color Difference]

A color difference (ΔE*) of the surface-treated steel sheet 1 of the present embodiment is preferably 3.0 or less. Here, the term "color difference (ΔE*)" refers to a color difference (ΔE*) determined based on L*a*b* values obtained before and after holding the surface-treated steel sheet 1 at a temperature of 60° C. and a humidity of 90% RH for 240 hours. The upper limit of the color difference (ΔE*) is more preferably 2.9, further preferably 2.7, further preferably 2.5, further preferably 2.3, further preferably 2.1, further preferably 2.0, further preferably 1.9, and further preferably 1.6. The lower limit of the color difference (ΔE*) is not particularly limited, and for example is 0.

[Steel Sheet]

The chemical composition of the steel sheet 2 is not particularly limited. The steel sheet 2 may be selected, for example, from the group consisting of low carbon steel containing carbon (C) in an amount of 0.25 in percent by mass or less, ultra-low carbon steel containing C in an amount of less than 0.01 in percent by mass, and non-aging ultra-low carbon steel obtained by adding Ti and Nb to an ultra-low carbon steel. The steel sheet 2 may be a cold-rolled steel sheet. Cold-rolled steel sheets made of low carbon steel are, for example, defined as SPCC, SPCD, SPCE, SPCF and SPCG in JIS (Japanese Industrial Standards) G3141 (2017). The steel sheet 2 may be any of these cold-rolled steel sheets. Further, the steel sheet 2 may be aluminum-killed steel.

As described above, the surface-treated steel sheet 1 of the present embodiment includes the steel sheet 2, and the Ni—Co—Fe alloy layer 3 containing Ni, Co, and Fe on the surface of the steel sheet 2. In the thickness direction of the Ni—Co—Fe alloy layer 3, the Co concentration in the Ni—Co—Fe alloy layer 3 is highest at a position ($P_{HCo}$) which is on the outermost surface side of the Ni—Co—Fe alloy layer 3 relative to a position ($P_{HNi}$) where the Ni concentration in the Ni—Co—Fe alloy layer 3 is highest, and which is between the outermost surface of the Ni—Co—Fe alloy layer 3 and a depth of 100 nm from the outermost surface. In the Ni—Co—Fe alloy layer 3, the Ni-concentrated region 4 in which the Ni concentration increases toward the outermost surface of the Ni—Co—Fe alloy layer 3 is formed between the outermost surface of the Ni—Co—Fe alloy layer 3 and the position ($P_{HCo}$) where the Co concentration is highest. Therefore, in the surface-treated steel sheet 1 of the present embodiment, the contact resistance is low and a change in the color of the surface can be suppressed.

[Production Method]

A method for producing the aforementioned surface-treated steel sheet 1 of the present embodiment will now be described. The method for producing the surface-treated steel sheet 1 described hereunder is one example of a method for producing the surface-treated steel sheet 1 of the present embodiment. Accordingly, the surface-treated steel sheet 1 composed as described above may be produced by another production method that is different from the production method described hereunder. However, the production method described hereunder is a preferable example of a method for producing the surface-treated steel sheet 1 of the present embodiment.

The method for producing the surface-treated steel sheet 1 of the present embodiment includes a process of preparing the steel sheet 2 (steel sheet preparation process), a process of forming an Ni plating layer of a surface of the steel sheet 2 (Ni plating process), a process of forming a Co plating layer on the Ni plating layer (Co plating process), a process of subjecting the steel sheet having the Ni plating layer and the Co plating layer to an alloying heat treatment (alloying heat treatment process), and a process of subjecting the steel sheet that underwent the alloying heat treatment to temper rolling (temper rolling process). Each of these processes is described hereunder.

[Steel Sheet Preparation Process]

In the steel sheet preparation process, the aforementioned steel sheet 2 is prepared. The steel sheet 2 may be supplied by a third party or may be produced. In the case of producing the steel sheet 2, for example, the steel sheet 2 is produced by the following method. Molten steel having the aforementioned chemical composition is produced. The produced molten steel is used to produce a cast piece. The produced cast piece is subjected to hot rolling, pickling, and cold rolling. Annealing and temper rolling may be performed after the cold rolling. The steel sheet 2 can be produced by the above process. The thickness of the steel sheet 2 is not particularly limited, and is selected according to the intended use of the surface-treated steel sheet 1. The thickness of the steel sheet 2 is, for example, 0.05 to 1.5 mm. In a case where the intended use is for a battery such as an alkaline battery, for example, the thickness is 0.1 to 1.0 mm.

[Ni Plating Process]

In the Ni plating process, an Ni plating layer consisting of Ni and impurities is formed on the surface of the steel sheet 2. Specifically, the steel sheet 2 is brought into contact with an Ni plating bath, and electroplating or electroless plating is performed. The Ni plating process may be performed by immersing the steel sheet 2 in an Ni plating bath and performing electroplating. A well-known Ni plating bath can be used as the Ni plating bath. The Ni plating bath, for example, is selected from the group consisting of a Watts bath, a sulfate bath, a sulfamate bath, a Wood's bath, a borofluoride bath, a chloride bath and a citrate bath. The Ni plating bath contains Ni ions. The content of Ni ions is, for example, 0.5 to 2.0 mol/L. The Ni ions may be added to the Ni plating bath as one or more kinds selected from the group consisting of nickel sulfate, ammonium nickel sulfate, nickel chloride and nickel sulfamate. The Ni plating bath may contain other components in addition to Ni ions. The other components are, for example, one or more kinds selected from the group consisting of boric acid, hydrochloric acid, sodium thiocyanate, citric acid, a brightener, a pH adjustor and a surface active agent. The other components are set as appropriate according to the type of Ni plating bath.

The plating conditions such as the Ni plating bath temperature, the pH of the Ni plating bath, and the Ni plating treatment time can be set as appropriate. For example, plating may be performed under conditions of an Ni plating bath temperature of 25° C. to 70° C. and a pH of the Ni plating bath of 1 to 5. In the case of electroplating, plating may be performed under conditions of a current density of 1 to 50 A/dm$^2$. The Ni plating treatment time is appropriately set according to the coating weight of the Ni plating (that is, the content of Ni in the Ni—Co—Fe alloy layer 3) (g/m$^2$).

In the Ni plating layer formation process, for example, a Watts bath containing nickel (II) sulfate hexahydrate: 240 to 380 g/L, nickel (II) chloride hexahydrate: 0.40 to 80 g/L, and boric acid: 20 to 55 g/L may be used. Using this Watts bath, electroplating may be performed under conditions in which the pH of the Ni plating bath is 3.5 to 4.5, the Ni plating bath temperature is 45 to 55° C., and the current density is 1 to 40 A/dm$^2$. The Ni plating treatment time is appropriately set according to the coating weight of the Ni plating (that is, the content of Ni in the Ni—Co—Fe alloy layer 3) (g/m$^2$). By this means, an Ni plating layer consisting of Ni and impurities can be formed on the surface of the steel sheet 2.

The Ni coating weight of the Ni plating layer is the same as the aforementioned content of Ni in the Ni—Co—Fe alloy layer 3. In other words, preferably the plating conditions are adjusted so that the Ni coating weight per side of the steel sheet 2 falls within the range of 1.34 to 35.6 g/m$^2$. In a case where Fe is to be completely diffused in the Ni—Co—Fe alloy layer 3, preferably the Ni coating weight per side of the steel sheet 2 is 1.34 to 5.36 g/m$^2$. In a case where Fe is to be partially diffused in the Ni—Co—Fe alloy layer 3, preferably the Ni coating weight per side of the steel sheet 2 is 5.36 to 35.6 g/m$^2$.

[Co Plating Process]

In the Co plating process, a Co plating layer consisting of Co and impurities is formed on the Ni plating layer. Specifically, the Ni plating layer on the surface of the steel sheet 2 is brought into contact with a Co plating bath, and electroplating is performed. The steel sheet 2 having the Ni plating layer may be immersed in a Co plating bath to perform electroplating. A commercially available Co plating bath can be used as the Co plating bath. The Co plating bath contains Co ions. The content of Co ions is, for example, 0.5 to 2.0 mol/L. The Co ions may be added to the Co plating bath as one or more kinds selected from the group consisting of cobalt sulfate and cobalt chloride. The Co plating bath may contain other components in addition to Co ions. The other components are, for example, one or more kinds selected from the group consisting of formic acid, boric acid, hydrochloric acid, sodium thiocyanate, citric acid, a brightener, a pH adjustor and a surface active agent. The other components are set as appropriate according to the type of Co plating bath.

The plating conditions such as the Co plating bath temperature, the pH of the Co plating bath, and the Co plating treatment time can be set as appropriate. For example, plating may be performed under conditions of a Co plating bath temperature of 25 to 70° C. and a pH of the Co plating bath of 1 to 5. In the case of electroplating, the electroplating may be performed with a current density of 1 to 50 A/dm$^2$. The Co plating treatment time is appropriately set according to the coating weight of the Co plating (that is, the content of Co in the Ni—Co—Fe alloy layer 3) (g/m$^2$).

In the Co plating layer formation process, for example, a Co plating bath containing cobalt (II) sulfate heptahydrate: 240 to 330 g/L, boric acid: 20 to 55 g/L, formic acid: 15 to 30 g/L, and sulfuric acid: 0.5 to 3 g/L may be used. Using this Co plating bath, electroplating may be performed tinder conditions in which the pH of the Co plating bath is 1 to 3, the Co plating bath temperature is 40 to 60° C., and the current density is 1 to 40 A/dm$^2$ The Co plating treatment time is appropriately set according to the coating weight of the Co plating (that is, the content of Co in the Ni—Co—Fe alloy layer 3) (g/m$^2$). By this means, a Co plating layer can be formed on the Ni plating layer.

The Co coating weight of the Co plating layer is the same as the aforementioned content of Co in the Ni—Co—Fe alloy layer 3. In other words, preferably the plating conditions are adjusted so that the Co coating weight per side of the steel sheet 2 falls within the range of 0.45 to 1.34 g/m$^2$.

[Alloying Heat Treatment Process]

In the alloying heat treatment process, the steel sheet 2 having the Ni plating layer and the Co plating layer is subjected to an alloying heat treatment. By performing the alloying heat treatment, Ni in the Ni plating layer, Co in the Co plating layer, and Fe contained in the steel sheet 2 diffuse with each other, and the Ni—Co—Fe alloy layer 3 is formed. A well-known heating furnace can be used as the alloying heat treatment furnace. The alloying heat treatment is performed by continuously supplying the steel sheet 2 into the heating furnace.

In the present embodiment, the Ni-concentrated region 4 can be formed in the Ni—Co—Fe alloy layer 3 by adjusting the alloying heat treatment conditions. In other words, by performing the alloying heat treatment under appropriate conditions, the Ni-concentrated region 4 in which the Ni concentration increases toward the outermost surface of the Ni—Co—Fe alloy layer can be formed between the outermost surface of the Ni—Co—Fe alloy layer 3 and the position ($P_{HCo}$) where the Co concentration is highest. By means of the Ni-concentrated region 4, oxidation of Co in the Ni—Co—Fe alloy layer 3 is suppressed, and the occurrence of a change in the color of the surface-treated steel sheet 1 can be suppressed.

Highest Temperature: 630 to 860° C.

If the highest temperature during the alloying heat treatment is less than 630° C., mutual diffusion between Ni in the Ni plating layer, Co in the Co plating layer, and Fe contained in the steel sheet 2 will be insufficient. In this case, the adhesion of the Ni—Co—Fe alloy layer 3 will decrease. On the other hand, if the highest temperature during the alloying heat treatment is more than 860° C., the hardness of the steel sheet 2 will decrease. Therefore, the treatment temperature during the alloying heat treatment is 630 to 860° C. A preferable lower limit of the treatment temperature during the alloying heat treatment is 720° C., and more preferably is 760° C. A preferable upper limit of the treatment temperature during the alloying heat treatment is 830° C., and more preferably is 810° C. Here, the term "highest temperature during the alloying heat treatment" refers to the highest temperature that the steel sheet 2 reaches inside the heating furnace.

Dew Point: −25° C. or More

If the dew point during the alloying heat treatment is less than −25° C., the Ni-concentrated region 4 cannot be formed between the outermost surface of the Ni—Co—Fe alloy layer 3 and the position ($P_{HCo}$) where the Co concentration is highest. Therefore, the dew point during the alloying heat treatment is to be −25° C. or more. A preferable lower limit of the dew point during the alloying heat treatment is −20° C., and more preferably is −10° C. Although an tipper limit of the dew point during the alloying heat treatment is not particularly limited, for example the tipper limit is 5° C., and preferably is less than 0° C. If the dew point during the alloying heat treatment is less than 0° C., the Co concentration can be increased relatively at the surface of the surface-treated steel sheet 1. As a result, the contact resistance of the surface-treated steel sheet 1 can be further lowered.

Although the reason that the Ni-concentrated region can be formed between the outermost surface of the Ni—Co—Fe alloy layer 3 and the position (μm) where the Co concentration is highest depending on the dew point during the alloying heat treatment is not certain, it is considered that the reason is as follows. Comparing Ni and Co, Ni is an element that is less easily oxidized, and Co is an element that is more easily oxidized. Under conditions in which the dew point is −25° C. or more, the oxygen concentration increases in comparison to a conventional alloying heat treatment atmosphere, and oxidation easily progresses. The Co plating layer that had been formed as the outermost layer at a time point prior to the alloying heat treatment is oxidized while diffusing toward the interior of the Ni—Co—Fe alloy layer 3 by the alloying heat treatment in the high dew point atmosphere. On the other hand, the Ni plating layer that had been formed as a layer underneath the Co plating layer at a time point prior to the alloying heat treatment is oxidized while diffusing toward the outermost surface of the Ni—

Co—Fe alloy layer 3 by the alloying heat treatment in the high dew point atmosphere. At such time, Ni is concentrated in the vicinity of the outermost surface of the Ni—Co—Fe alloy layer 3. By this means, the Ni-concentrated region 4 in which the Ni concentration increases toward the outermost surface of the Ni—Co—Fe alloy layer 3 is formed between the outermost surface of the Ni—Co—Fe alloy layer 3 and the position ($P_{HCo}$) where the Co concentration is highest.

The atmospheric gas during the alloying heat treatment is not particularly limited, and for example is $N_2$+2 to 25% $H_2$. In $N_2$+2 to 25% $H_2$, the dew point can be adjusted, for example, by spraying water vapor so as to obtain the aforementioned dew point.

Soaking Time: 10 to 180 Seconds

If the soaking time during the alloying treatment is less than 10 seconds, mutual diffusion between Ni in the Ni plating layer, Co in the Co plating layer, and Fe contained in the steel sheet 2 will be insufficient. In this case, the adhesion of the Ni—Co—Fe alloy layer 3 will decrease. On the other hand, if the soaking time during the alloying treatment is more than 180 seconds, the hardness of the steel sheet 2 will decrease. Therefore, the soaking time is 10 to 180 seconds. A preferable lower limit of the soaking time is 15 seconds, and more preferably is 20 seconds. A preferable upper limit of the soaking time is 60 seconds, and more preferably is 40 seconds. Here, the term "soaking time during the alloying treatment" refers to the soaking time at the aforementioned highest temperature of the steel sheet 2.

The surface-treated steel sheet 1 in which the Ni—Co—Fe alloy layer 3 has been formed by the alloying heat treatment is cooled. The cooling is performed by a well-known method. The cooling is, for example, gas cooling. The surface-treated steel sheet 1 may be cooled, for example, from the highest temperature during the alloying heat treatment to about 300 to 100° C. by gas cooling.

[Temper Rolling Process]

In the temper rolling process, temper rolling is performed on the steel sheet subjected to the alloying heat treatment. By appropriately setting the temper rolling conditions, the thickness, total elongation, press formability, and yield strength and the like of the surface-treated steel sheet 1 can be adjusted. The rolling reduction in the temper rolling is, for example, 0.5 to 3.0%.

The surface-treated steel sheet 1 of the present embodiment can be produced by the production processes described above. Note that, the method for producing the surface-treated steel sheet 1 of the present embodiment may include another process in addition to the processes described above.

[Other Process]

An example of another process is a preparation process. The preparation process may be performed before the Ni plating process.

[Preparation Process]

A preparation process may be performed before the Ni plating process. In the preparation process, the surface of the prepared steel sheet 2 is subjected to alkaline degreasing and/or pickling, to thereby remove an oxide film and impurities at the surface of the steel sheet 2. As a result, the adhesion of the Ni plating layer increases. Further, plating defects of the Ni plating layer can be reduced.

EXAMPLES

Hereunder, advantageous effects of the surface-treated steel sheet of the present embodiment will be described more specifically by way of Examples. The conditions adopted in the following Examples are one example of conditions which are employed for confirming the workability and advantageous effects of the surface-treated steel sheet of the present embodiment. Accordingly, the surface-treated steel sheet of the present embodiment is not limited to this one example of the conditions.

[Steel Sheet Preparation Process]

Steel sheets consisting of aluminum-killed steel having a thickness of 0.25 mm were prepared. The steel sheets had a chemical composition consisting of C: 0.0090%, Si: 0.006%, Mn: 0.12%, P: 0.012%, S: 0.0088%, sol. Al: 0.047%, and N: 0.0025%, with the balance being Fe and impurities. The steel sheets were subjected to preparations consisting of alkaline degreasing and pickling.

[Ni Plating Process]

A Ni plating layer was formed on the surface of the respective steel sheets of Test Number 1 to Test Number 12 that had been subjected to the preparations. The Ni plating layer was formed on both sides of each steel sheet. The obtained Ni plating layer was a plating layer consisting of Ni and impurities. The Ni plating conditions for each test number are shown below.

TABLE 1

| | Ni Plating Bath Composition | | | | | Ni Plating Conditions | | |
|---|---|---|---|---|---|---|---|---|
| Test No. | Nickel (II) Sulfate Hexahydrate (g/L) | Nickel (II) Chloride Hexahydrate (g/L) | Boric Acid (g/L) | Ni Ions Concentration (g/L) | pH | Ni Plating Bath Temperature (° C.) | Current Density (A/dm$^2$) | Ni Plating Treatment Time (s) |
| 1 | 240 | 45 | 30 | 65 | 4 | 50 | 15 | 45 |
| 2 | 240 | 45 | 30 | 65 | 4 | 50 | 20 | 40 |
| 3 | 240 | 45 | 30 | 65 | 4 | 50 | 30 | 40 |
| 4 | 240 | 45 | 30 | 65 | 4 | 50 | 7 | 26 |
| 5 | 240 | 45 | 30 | 65 | 4 | 50 | 40 | 21 |
| 6 | 240 | 45 | 30 | 65 | 4 | 50 | 5 | 10 |
| 7 | 240 | 45 | 30 | 65 | 4 | 50 | 8 | 26 |
| 8 | 240 | 45 | 30 | 65 | 4 | 50 | 20 | 40 |
| 9 | 240 | 45 | 30 | 65 | 4 | 50 | 20 | 40 |
| 10 | 240 | 45 | 30 | 65 | 4 | 50 | 20 | 40 |
| 11 | 240 | 45 | 30 | 65 | 4 | 50 | 20 | 40 |
| 12 | 240 | 45 | 30 | 65 | 4 | 50 | 20 | 35 |

[Co Plating Process]

In Test Number 1 to Test Number 11, A Co plating layer was formed on the Ni plating layer. The Co plating layer was formed on both sides of the steel sheet. The obtained Co plating layer was a plating layer consisting of Co and impurities. The Co plating conditions for Test Number 1 to Test Number 11 are shown below,

TABLE 2

| | Co Plating Bath Composition | | | | | | Co Plating Conditions | | |
|---|---|---|---|---|---|---|---|---|---|
| Test No. | Cobalt (II) Sulfate Heptahydrate (g/L) | Boric Acid (g/L) | Formic Acid (g/L) | Sulfuric Acid (g/L) | Co Ions Concentration (g/L) | pH | Co Plating Bath Temperature (° C.) | Current Density (A/dm$^2$) | Co Plating Treatment Time (s) |
| 1 | 300 | 30 | 20 | 2 | 63 | 2 | 50 | 10 | 5 |
| 2 | 300 | 30 | 20 | 2 | 63 | 2 | 50 | 15 | 5 |
| 3 | 300 | 30 | 20 | 2 | 63 | 2 | 50 | 15 | 10 |
| 4 | 300 | 30 | 20 | 2 | 63 | 2 | 50 | 15 | 5 |
| 5 | 300 | 30 | 20 | 2 | 63 | 2 | 50 | 15 | 7 |
| 6 | 300 | 30 | 20 | 2 | 63 | 2 | 50 | 15 | 5 |
| 7 | 300 | 30 | 20 | 2 | 63 | 2 | 50 | 15 | 5 |
| 8 | 300 | 30 | 20 | 2 | 63 | 2 | 50 | 13 | 5 |
| 9 | 300 | 30 | 20 | 2 | 63 | 2 | 50 | 15 | 5 |
| 10 | 300 | 30 | 20 | 2 | 63 | 2 | 50 | 15 | 5 |
| 11 | 300 | 30 | 20 | 2 | 63 | 2 | 50 | 15 | 5 |

In Test Number 12, a Co—Ni alloy plating layer containing Co and Ni was formed on the Ni plating layer. The Co—Ni alloy plating layer was formed on both sides of the steel sheet. The obtained Co—Ni alloy plating layer was a plating layer consisting of Co, Ni and impurities. The Co—Ni alloy plating conditions in Test Number 12 are shown below.

TABLE 3

| | Co-Ni Plating Bath Composition | | | | | | Co-Ni Plating Conditions | | |
|---|---|---|---|---|---|---|---|---|---|
| Test No. | Cobalt (II) Sulfate Heptahydrate (g/L) | Nickel (II) Sulfate Hexahydrate (g/L) | Boric Acid (g/L) | Co Ions Concentration (g/L) | Ni Ions Concentration (g/L) | pH | Co-Ni Plating Bath Temperature (° C.) | Current Density (A/dm$^2$) | Co-Ni Plating Treatment Time (s) |
| 12 | 140 | 130 | 30 | 29 | 29 | 4 | 50 | 15 | 10 |

[Alloying Heat Treatment Process]

Steel sheets having an Ni plating layer and a Co plating layer, or having an Ni plating layer and a Co—Ni alloy plating layer were subjected to a continuous alloying heat treatment. The alloying heat treatment was performed under the following conditions. The detailed alloying heat treatment conditions for each test number are shown in Table 4.

Highest temperature: 640 to 830° C.
Dew point: −30 to 0° C.
Atmosphere: N$_2$+2% H$_2$
Soaking time: 20 to 120 seconds
Cooling: N$_2$ gas cooling to 100° C.

[Temper Rolling Process]

Each steel sheet after the alloying heat treatment was subjected to temper rolling. The rolling reduction in the temper rolling was 1.5%. The surface-treated steel sheet 1 of each test number was produced by the above processes.

TABLE 4

| | Alloying Heat Treatment Conditions | | | Ni-Co-Fe Alloy Layer | | | | | | | | Thickness of Ni-Concentrated Region (μm) | Evaluation Results | |
|---|---|---|---|---|---|---|---|---|---|---|---|---|---|---|
| Test No. | Highest Temperature (° C.) | Dew Point (° C.) | Soaking Time (s) | Ni Content (g/m$^2$) | Co Content (g/m$^2$) | Thickness of Ni-Co-Fe Alloy Layer (μm) | Outermost Surface Ni Concentration (%) | Ni Peak Depth (μm) | Co Peak Depth (nm) | Co/Ni Ratio | Ni-Concentrated Region | | Impedance (Ω) | Color Difference (ΔE*) |
| 1 | 760 | −25 | 20 | 19.5 | 0.44 | 2.2 | 22 | 0.5 | 50 | 9.0 | F | 0.05 | 3 | 2.3 |
| 2 | 780 | −10 | 30 | 23.1 | 0.67 | 2.1 | 48 | 0.6 | 60 | 6.0 | F | 0.06 | 5 | 1.7 |
| 3 | 800 | −10 | 45 | 34.7 | 1.30 | 3.3 | 52 | 0.9 | 100 | 4.0 | F | 0.10 | 8 | 1.6 |
| 4 | 760 | 0 | 30 | 5.3 | 0.66 | 2.8 | 58 | 0.5 | 50 | 0.6 | F | 0.05 | 45 | 1.2 |
| 5 | 830 | −10 | 30 | 24.3 | 0.89 | 2.2 | 38 | 0.6 | 40 | 5.5 | F | 0.04 | 6 | 2.1 |

TABLE 4-continued

| | Alloying Heat Treatment Conditions | | | Ni-Co-Fe Alloy Layer | | | | | | | | Thickness of Ni-Concentrated Region (μm) | Evaluation Results | |
|---|---|---|---|---|---|---|---|---|---|---|---|---|---|---|
| Test No. | Highest Temperature (°C.) | Dew Point (°C.) | Soaking Time (s) | Ni Content (g/m²) | Co Content (g/m²) | Thickness of Ni-Co-Fe Alloy Layer (μm) | Outermost Surface Ni Concentration (%) | Ni Peak Depth (μm) | Co Peak Depth (nm) | Co/Ni Ratio | Ni-Concentrated Region | | Impedance (Ω) | Color Difference (ΔE*) |
| 6 | 780 | −10 | 30 | 1.4 | 0.67 | 0.2 | 25 | 0.1 | 50 | 9.0 | F | 0.05 | 2 | 2.2 |
| 7 | 780 | −10 | 30 | 5.9 | 0.68 | 0.2 | 27 | 0.1 | 50 | 8.0 | F | 0.05 | 2 | 2.3 |
| 8 | 780 | −10 | 30 | 22.8 | 0.50 | 2.1 | 46 | 0.6 | 60 | 7.0 | F | 0.06 | 7 | 1.6 |
| 9 | 830 | 0 | 120 | 23.2 | 0.65 | 5.3 | 70 | 1.3 | 40 | 1.2 | F | 0.04 | 47 | 0.8 |
| 10 | 640 | −10 | 30 | 23.1 | 0.67 | 1.8 | 12 | 0.7 | 50 | 8.0 | F | 0.05 | 2 | 2.9 |
| 11 | 780 | −30 | 30 | 23.1 | 0.67 | 2.2 | 15 | 0.7 | 50 | 7.0 | N | — | 4 | 6.3 |
| 12 | 780 | −10 | 30 | 22.2 | 0.65 | 2.2 | 60 | 0.8 | 400 | 0.2 | N | — | 160 | 2.0 |

[Test to Measure Content of Ni and Content of Co in Ni—Co—Fe Alloy Layer]

The content of Ni and content of Co in the Ni—Co—Fe alloy layer of the surface-treated steel sheet of each test number were measured by the following method. The Ni—Co—Fe alloy layer of the surface-treated steel sheet of each test number was subjected to elemental analysis using a fluorescent X-ray analyzer. As the fluorescent X-ray analyzer, ZSX Primus II manufactured by Rigaku Corporation was used. The fluorescent X-ray analyzer prepared a calibration curve in advance using a standard sample having a known content of Ni and a standard sample having a known content of Co. The content of Ni (g/m²) and the content of Co (g/m²) in the Ni—Co—Fe alloy layer were determined based on the calibration curve. The results are shown in the column "Ni Content (g/m²)" and the column "Co Content (g/m²)" in Table 4.

[Test to Measure Ni Concentration, Co Concentration, and Fe Concentration by GDS]

The Ni concentration, Co concentration, and Fe concentration in the Ni—Co—Fe alloy layer of the surface-treated steel sheet of each test number were measured by glow discharge spectrometry (GDS). A radio-frequency glow discharge optical emission spectrometer (manufactured by Horiba Ltd., model: GD-Profiler 2) was used for the measurement. The emission intensity of Ni, emission intensity of Co, and emission intensity of Fe were converted to the content of Ni (mass %), content of Co (mass %), and content of Fe (mass %), respectively. The sum of the obtained content of Ni (mass %), content of Co (mass %), and content of Fe (mass %) was taken as 100%, and the proportion (%) of Ni, proportion (%) of Co, and proportion (%) of Fe were determined. The obtained proportion (%) of Ni, proportion (%) of Co, and proportion (%) of Fe were adopted as the Ni concentration (%), Co concentration (%), and Fe concentration (%), respectively. Here, the Ni—Co—Fe alloy layer may not necessarily be accurately measured in measurement data for which the depth obtained by conversion from the Ar sputtering time is less than 0.006 μm (6 nm), and therefore such measurement data was removed from the object of analysis, and only data for which the depth obtained by conversion from the Ar sputtering time was 0.006 μm or more was used. A point at which the depth obtained by conversion from the Ar sputtering time was 0.006 μm was taken as the depth of 0 μm. The GDS measurement conditions were as follows.

Figure 6:
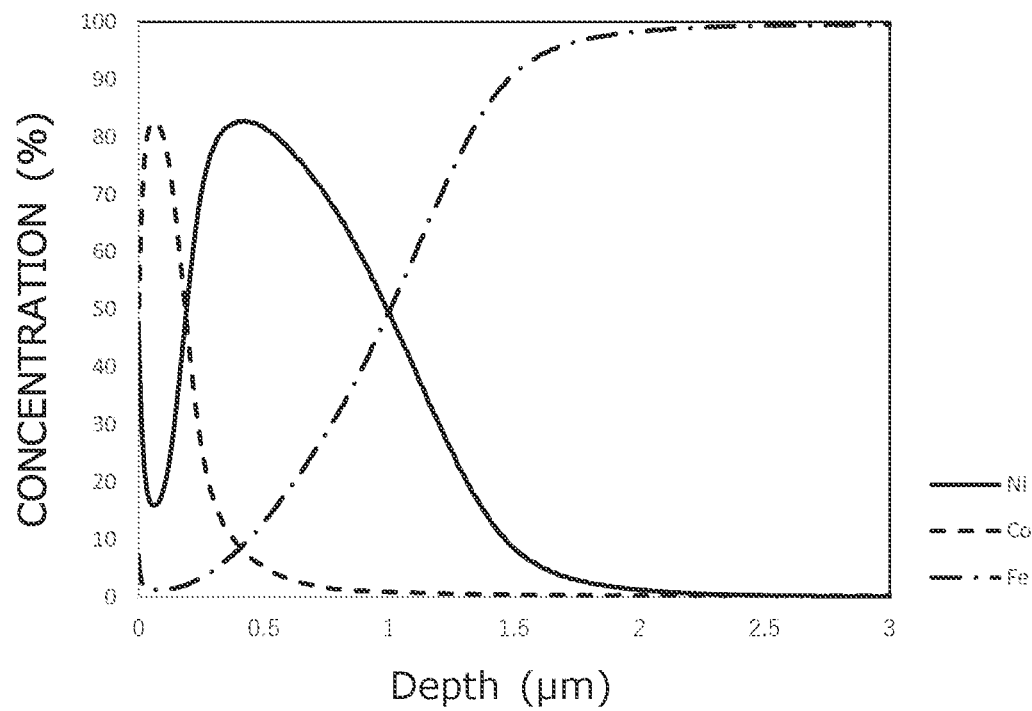
FIG. 6 is a graph showing results of GDS analysis of a surface-treated steel sheet of Test Number 2 in the Examples.
Figure 7:
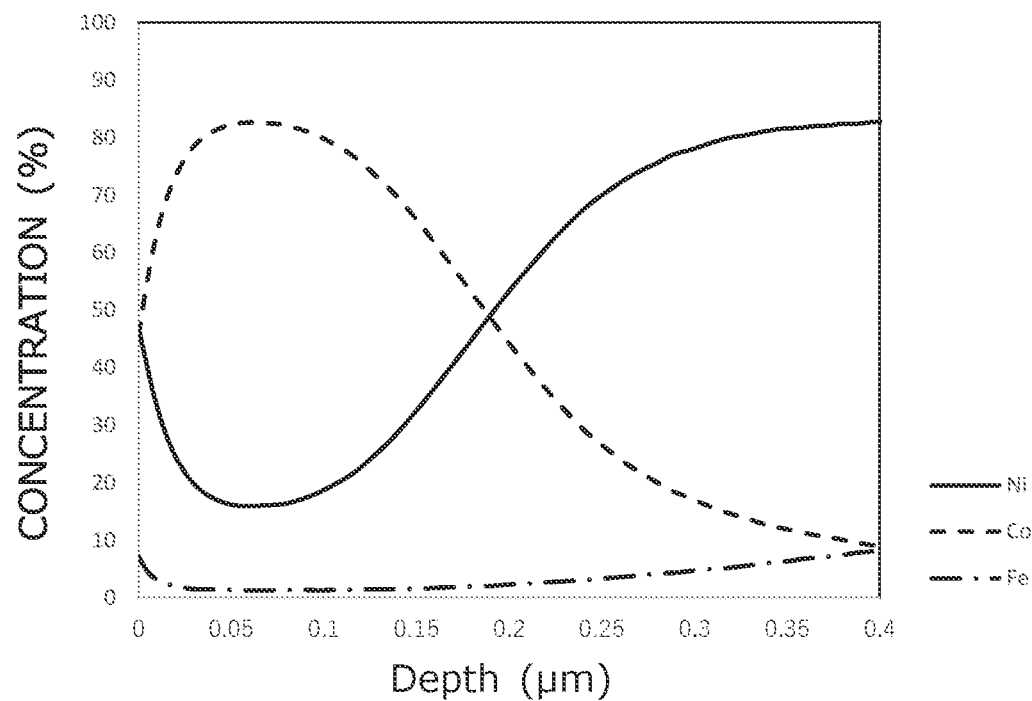
FIG. 7 is an enlarged view of a range from a depth of 0 to 0.4 μm in the graph in FIG. 6.
Figure 10:
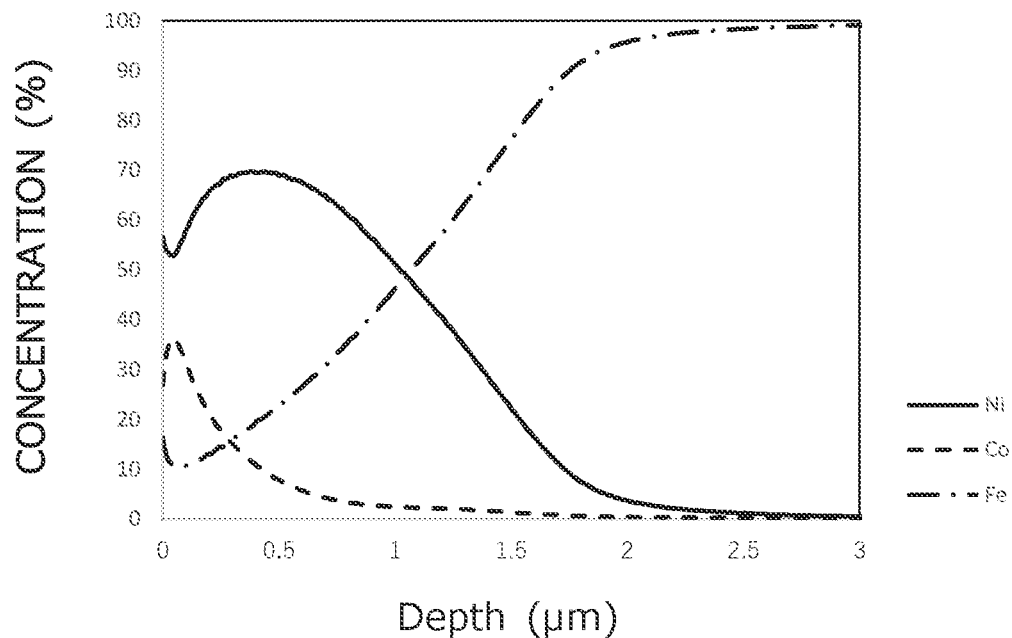
FIG. 10 is a graph showing results of GDS analysis of a surface-treated steel sheet of Test Number 4 in the Examples.
Figure 11:
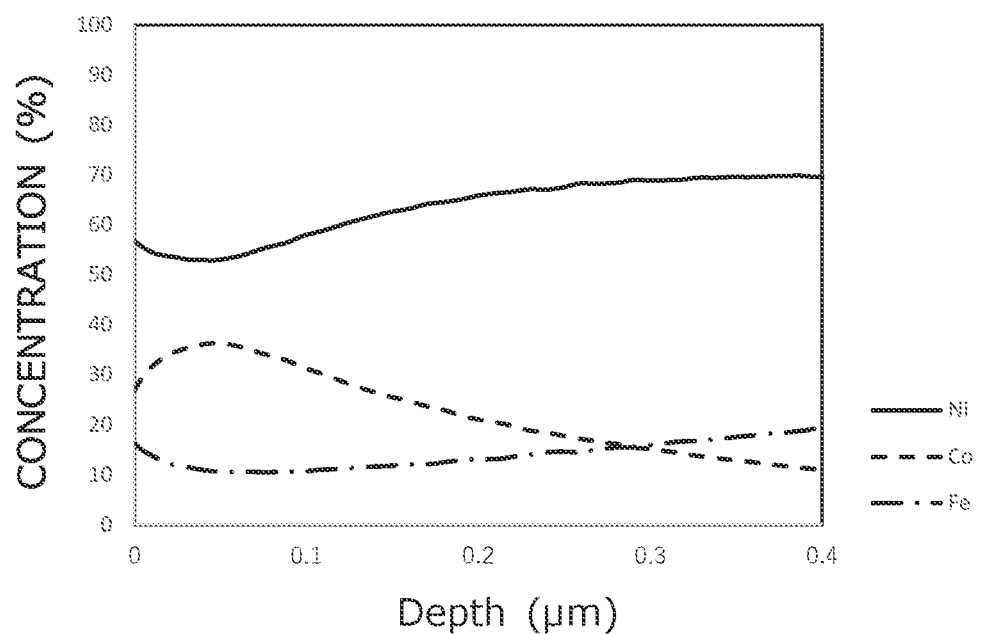
FIG. 11 is an enlarged view of a range from a depth of 0 to 0.4 μm in the graph in FIG. 10.
Figure 12:
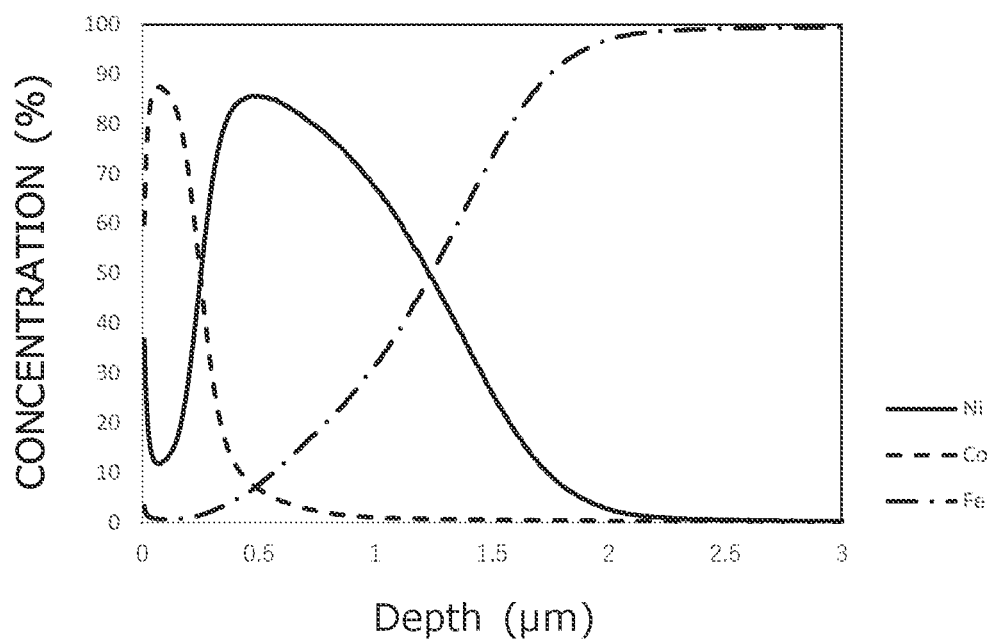
FIG. 12 is a graph showing results of GDS analysis of a surface-treated steel sheet of Test Number 5 in the Examples.
Figure 13:
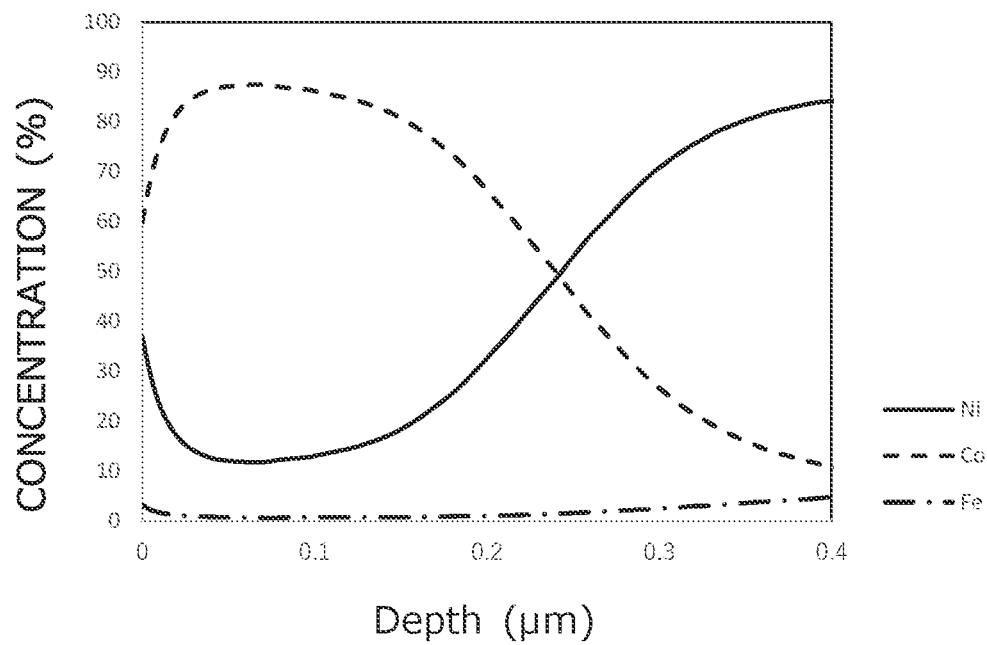
FIG. 13 is an enlarged view of a range from a depth of 0 to 0.4 pam in the graph in FIG. 12.

H.V.: 785 V for Fe, 630 V for Ni, 720 V for Co
Anode diameter: φ 4 mm
Gas: Ar
Gas pressure: 600 Pa
Output: 35 W Graphs of the GDS analysis results of the respective test numbers are shown in FIG. 1 to FIG. 2, and FIG. 6 to FIG. 13. The axis of ordinates of each GDS chart shows the Ni concentration, the Co concentration and the Fe concentration. The axis of abscissas of each GDS chart shows the distance (depth) (μm) from the outermost surface of the Ni—Co—Fe alloy layer obtained by conversion from the Ar sputtering time. A graph of the GDS analysis results for Test Number 1 is shown in FIG. 1. A graph of the GDS analysis results for Test Number 2 is shown in FIG. 6. A graph of the GDS analysis results for Test Number 3 is shown in FIG. 8. A graph of the GDS analysis results for Test Number 4 is shown in FIG. 10. A graph of the GDS analysis results for Test Number 5 is shown in FIG. 12. FIG. 2, FIG. 7, FIG. 9, FIG. 11 and FIG. 13 are enlarged views of a range of a depth of 0 to 0.4 μm in the graphs of FIG. 1, FIG. 6, FIG. 8, FIG. 10 and FIG. 12, respectively.

The following items were determined from the results of the GDS analysis. The distance in the thickness direction of the Ni—Co—Fe alloy layer from the surface of the surface-treated steel sheet to a position at which the Ni concentration was 1% was determined and adopted as the thickness (μm) of the Ni—Co—Fe alloy layer. The results are shown in the column "Thickness of Ni—Co—Fe Alloy Layer (μm)" in Table 4. The Ni concentration in the outermost surface of the Ni—Co—Fe alloy layer was determined. The results are shown in the column "Outermost Surface Ni Concentration (%)" in Table 4. Here, the term "Ni concentration in the outermost surface of the Ni—Co—Fe alloy layer" refers to the Ni concentration at the initial depth at which the depth obtained by conversion from the Ar sputtering time was 0.006 μm or more. In the thickness direction of the Ni—Co—Fe alloy layer, a distance (Ni peak depth) from the outermost surface of the Ni—Co—Fe alloy layer to the position ($P_{HNi}$) where the Ni concentration was highest was determined. The results are shown in the column "Ni Peak Depth (am)" in Table 4. Further, in the thickness direction of the Ni—Co—Fe alloy layer, a distance (Co peak depth) from the outermost surface of the Ni—Co—Fe alloy layer to the position ($P_{HCo}$) where the Co concentration was highest was determined. The results are shown in the column "Co Peak Depth (nm)" in Table 4. The ratio of the Co concentration to the Ni concentration at the position ($P_{HCo}$) where the Co concentration was highest was determined. The results are shown in the column "Co/Ni Ratio" in Table 4. Further, in the thickness direction of the Ni—Co—Fe alloy layer, whether or not a region in which the Ni concentration increased in the direction toward the outermost surface of the Ni—Co—Fe alloy layer was present between the outermost surface of the Ni—Co—Fe alloy layer and the position ($P_HCc$) where the Co concentration was highest was investigated. The results are shown in the column "Ni-Concentrated Region" in Table 4. In the thickness direction of the Ni—Co—Fe alloy layer, if an Ni-concentrated region was present between the outermost surface of the Ni—Co—Fe alloy layer and the position ($P_{HCo}$) where the Co concentration was highest, it was determined that an Ni-concentrated region was formed. If the letter "F" (Formed) is described in the column "Ni-Concentrated Region" in Table 4, it indicates that an Ni-concentrated region was formed. On the other hand, in the thickness direction of the Ni—Co—Fe alloy layer, if an Ni-concentrated region was not present between the outermost surface of the Ni—Co—Fe alloy layer and the position ($P_{HCo}$) where the Co concentration was highest, it was determined that an Ni-concentrated region was not formed. If the letter "N" (Not Formed) is described in the column "Ni-Concentrated Region" in Table 4, it indicates that an Ni-concentrated region was not formed. Further, the distance in the thickness direction of the Ni—Co—Fe alloy layer of a region in which the Ni concentration increased in the thickness direction of the Ni—Co—Fe alloy layer towards the outermost surface of the Ni—Co—Fe alloy layer and which was a region that, in the thickness direction of the Ni—Co—Fe alloy layer 3, was between the outermost surface of the Ni—Co—Fe alloy layer 3 and a position where the Ni concentration was lowest within a range from a position where the Ni concentration was highest to the outermost surface of the Ni—Co—Fe alloy layer 3 was adopted as the thickness (μm) of the Ni-concentrated region. The results are shown in the column "Thickness of Ni-Concentrated Region (μm)" in Table 4.

[Impedance Measurement Test]

The charge transfer resistance on the surface of the surface-treated steel sheet of each test number was measured. Specifically, the surface-treated steel sheet of each test number was held at a constant potential for 10 days at 0.3 V vs. Hg/HgO in a 35% KOH aqueous solution at 60° C. Here, 0.3 V vs. Hg/HgO is the potential of manganese dioxide in the positive electrode of a manganese battery. The impedance value at a frequency of 0.1 Hz of the surface-treated steel sheet after being held at the constant potential was measured. The measurement was performed using HZ-7000 manufactured by Hokuto Denko Co., Ltd. The results are shown in Table 4.

[Color Difference Measurement Test]

The surface-treated steel sheet of each test number was placed in a constant temperature and humidity testing machine (manufactured by ESPEC. CORP.; model name: LH), and held at a temperature of 60° C. and a humidity of 90% RH for 240 hours. The L*a*b* values of the surface-treated steel sheet were measured before and after being held at the constant temperature and constant humidity. A spectrophotometer (manufactured by KONICA MINOLTA, INC., model number CM-700d) was used for the measurement. The measurement conditions were as follows: measurement diameter: (φ8 mm, SCE, D65 light, and 2° visual field. A color difference (ΔE*) was determined based on the L*a*b* values before and after being held at the constant temperature and constant humidity. The results are shown in Table 4.

[Evaluation Results]

Referring to Table 4, and FIGS. 1 to 2 and FIGS. 6 to 13, the surface-treated steel sheet of each of Test Numbers 1 to 10 included a Ni—Co—Fe alloy layer containing Ni, Co, and Fe on the steel sheet surface, and in the thickness direction of the Ni—Co—Fe alloy layer, the Co concentration in the Ni—Co—Fe alloy layer was highest at a position which was on the outermost surface side of the Ni—Co—Fe alloy layer relative to the position where the Ni concentration was highest in the Ni—Co—Fe alloy layer, and was between the outermost surface of the Ni—Co—Fe alloy layer and a depth of 100 nm. In addition, in the surface-treated steel sheets of Test Numbers 1 to 10, an Ni-concentrated region had been formed between the outermost surface of the Ni—Co—Fe alloy layer and the position where the Co concentration was highest. As a result, in the surface-treated steel sheet of each of Test Numbers 1 to 10, the impedance value (Ω) was 50 (Ω) or less, and the color difference (ΔE*) between before and after being exposed to the constant temperature and constant humidity conditions was 3.0 or less. In the surface-treated steel sheet of each of Test Numbers 1 to 10, the contact resistance was low and it was possible to suppress a change in the color of the surface.

Further, the impedance value (Ω) of the surface-treated steel sheet of each of Test Numbers 1 to 3 and 5 to 8 in which the "Co/Ni ratio" was 3.0 or more was 10 (Ω) or less, and thus the contact resistance was further lowered. In addition, the color difference (ΔE*) of the surface-treated steel sheet of each of Test Numbers 1 to 9 in which the "outermost surface Ni concentration (%)" was 20(%) or more was 2.5 or less, and a change in the color of the surface was further suppressed.

On the other hand, the surface-treated steel sheet of Test Number 11 included an Ni—Co—Fe alloy layer containing Ni, Co, and Fe on the steel sheet surface, and in the thickness direction of the Ni—Co—Fe alloy layer, the Co concentration in the Ni—Co—Fe alloy layer was highest at a position which was on the outermost surface side of the Ni—Co—Fe alloy layer relative to the position where the Ni concentration was highest in the Ni—Co—Fe alloy layer, and was between the outermost surface of the Ni—Co—Fe alloy layer and a depth of 100 nm. However, in the surface-treated steel sheet of Test Number 11, an Ni-concentrated region had not been formed between the outermost surface of the Ni—Co—Fe alloy layer and the position ($P_{HCo}$) where the Co concentration was highest. As a result, for the surface-treated steel sheet of Test Number 11, the color difference (ΔE*) between before and after being exposed to the constant temperature and constant humidity conditions was 6.3. Although the surface-treated steel sheet of Test Number 11 had low contact resistance, a change in the color of the surface could not be suppressed.

In the surface-treated steel sheet of Test Number 12, the position where the Co concentration was highest in the Ni—Co—Fe alloy layer was too deep. Specifically, the Co concentration in the Ni—Co—Fe alloy layer was highest at a position at a depth of 400 nm from the outermost surface of the Ni—Co—Fe alloy layer. As a result, the impedance value (Ω) of the surface-treated steel sheet of Test Number 12 was 160, and the contact resistance was high.

An embodiment of the present disclosure has been described above. However, the foregoing embodiment is merely an example for implementing the present disclosure. Accordingly, the present disclosure is not limited to the above embodiment, and the above embodiment can be appropriately modified within a range that does not deviate from the gist of the present invention.

REFERENCE SIGNS LIST

1 Surface-treated Steel Sheet
2 Steel Sheet

3 Ni—Co—Fe Alloy Layer
4 Ni-Concentrated Region
Positive electrode (Manganese Dioxide)
11 Negative electrode (Zinc)
12 Separator
13 Current Collector
14 Insulator
15 Positive electrode Terminal

The invention claimed is:

1. A surface-treated steel sheet, comprising:
a steel sheet, and
an Ni—Co—Fe alloy layer containing Ni, Co, and Fe on the steel sheet surface,
wherein:
in a thickness direction of the Ni—Co—Fe alloy layer, a Co concentration in percent by mass in the Ni—Co—Fe alloy layer is highest at a position which is on an outermost surface side of the Ni—Co—Fe alloy layer relative to a position where an Ni concentration in percent by mass in the Ni—Co—Fe alloy layer is highest, and the Co concentration in percent by mass is highest between the outermost surface of the Ni—Co—Fe alloy layer and a depth of 100 nm from the outermost surface; and
the Ni—Co—Fe alloy layer includes:
an Ni-concentrated region in which the Ni concentration in percent by mass increases toward the outermost surface of the Ni—Co—Fe alloy layer between the outermost surface of the Ni—Co—Fe alloy layer and a position where the Co concentration is highest.

2. The surface-treated steel sheet according to claim 1, wherein:
in the thickness direction of the Ni—Co—Fe alloy layer, at the position at which the Co concentration is highest, a ratio of the Co concentration to the Ni concentration is 3.0 or more.

3. The surface-treated steel sheet according to claim 1, wherein:
per side of the steel sheet, a content of Ni in the Ni—Co—Fe alloy layer is 1.34 to 5.36 $g/m^2$, and a content of Co in the Ni—Co—Fe alloy layer is 0.45 to 1.34 $g/m^2$.

4. The surface-treated steel sheet according to claim 1, wherein:
per side of the steel sheet, a content of Ni in the Ni—Co—Fe alloy layer is 5.36 to 35.6 $g/m^2$, and a content of Co in the Ni—Co—Fe alloy layer is 0.45 to 1.34 $g/m^2$.

5. The surface-treated steel sheet according to claim 2, wherein:
per side of the steel sheet, a content of Ni in the Ni—Co—Fe alloy layer is 1.34 to 5.36 $g/m^2$, and a content of Co in the Ni—Co—Fe alloy layer is 0.45 to 1.34 $g/m^2$.

6. The surface-treated steel sheet according to claim 2, wherein:
per side of the steel sheet, a content of Ni in the Ni—Co—Fe alloy layer is 5.36 to 35.6 $g/m^2$, and a content of Co in the Ni—Co—Fe alloy layer is 0.45 to 1.34 $g/m^2$.

* * * * *